United States Patent
Elkotby et al.

(10) Patent No.: US 12,133,255 B2
(45) Date of Patent: Oct. 29, 2024

(54) METHODS AND APPARATUS FOR WAVEFORM DESIGN AND SIGNALING FOR ENERGY HARVESTING

(71) Applicant: InterDigital Patent Holdings, Inc., Wilmington, DE (US)

(72) Inventors: Hussain Elkotby, Conshohocken, PA (US); Anantharaman Balasubramanian, San Diego, CA (US); Marian Rudolf, Montreal (CA); Tanbir Haque, Jackson Heights, NY (US); Patrick Cabrol, Bayshore, NY (US); Ravikumar Pragada, Warrington, PA (US)

(73) Assignee: InterDigital Patent Holdings, Inc., Wilmingto, DE (US)

( * ) Notice: Subject to any disclaimer, the term of this patent is extended or adjusted under 35 U.S.C. 154(b) by 226 days.

(21) Appl. No.: 17/610,404

(22) PCT Filed: May 16, 2020

(86) PCT No.: PCT/US2020/033306
§ 371 (c)(1),
(2) Date: Nov. 10, 2021

(87) PCT Pub. No.: WO2020/236665
PCT Pub. Date: Nov. 26, 2020

(65) Prior Publication Data
US 2022/0225402 A1     Jul. 14, 2022

Related U.S. Application Data

(60) Provisional application No. 62/849,640, filed on May 17, 2019.

(51) Int. Cl.
*H04W 74/00*     (2009.01)
*H02J 50/00*     (2016.01)
(Continued)

(52) U.S. Cl.
CPC ......... *H04W 74/004* (2013.01); *H02J 50/001* (2020.01); *H02J 50/20* (2016.02);
(Continued)

(58) Field of Classification Search
CPC . H04W 74/004; H04W 28/0221; H02J 50/20; H02J 50/40; H02J 50/001; H04L 47/26
See application file for complete search history.

(56) References Cited

U.S. PATENT DOCUMENTS

| | | | |
|---|---|---|---|
| 2011/0181399 A1* | 7/2011 | Pollack | G06K 19/0717 340/10.33 |
| 2018/0331966 A1 | 11/2018 | Lee et al. | |
| 2020/0314752 A1 | 10/2020 | Taque et al. | |

FOREIGN PATENT DOCUMENTS

| WO | WO 2016099365 A1 | 6/2016 |
|---|---|---|
| WO | WO 2020131813 A1 | 6/2020 |
| WO | WO 2020131834 A1 | 7/2020 |

OTHER PUBLICATIONS

N. Van Huynh et al, "Ambient Backscatter Communications: A Contemporary Survey," in IEEE Communications Surveys & Tutorials, vol. 20, No. 4, pp. 2889-2922, 2018.

\* cited by examiner

*Primary Examiner* — Duc C Ho
(74) *Attorney, Agent, or Firm* — Flaster Greenberg P.C.

(57) ABSTRACT

A method implemented in a wireless transmit/receive unit (WTRU) for wireless communications includes receiving a signal sequence from a base station (BS) and generating a channel quality indicator (CQI) indication based on the signal, transmitting the CQI indication to the BS, receiving a first control message from the BS comprising configuration information, wherein the configuration information includes information elements for configuring CQI subgroups, determining a CQI subgroup identifier (ID) based on
(Continued)

the information elements included in the received first control message, and transmitting an energy harvesting feedback using at least one resource associated with the CQI subgroup ID.

20 Claims, 23 Drawing Sheets

(51) Int. Cl.
*H02J 50/20* (2016.01)
*H02J 50/40* (2016.01)
*H04L 47/26* (2022.01)
*H04W 28/02* (2009.01)

(52) U.S. Cl.
CPC .............. *H02J 50/40* (2016.02); *H04L 47/26* (2013.01); *H04W 28/0221* (2013.01)

METHODS AND APPARATUS FOR WAVEFORM DESIGN AND SIGNALING FOR ENERGY HARVESTING

CROSS-REFERENCE TO RELATED APPLICATIONS

This application claims the benefit, under 35 U.S.C. 371 of International Application PCT/US2020/033306, filed May 16, 2020, which the benefit of U.S. Provisional Application No. 62/849,640 filed in the U.S. Patent and Trademark Office on May 17, 2019, which is incorporated herein by reference in its entirety.

SUMMARY

Embodiments disclosed herein generally relate to wireless communication networks. For example, various embodiments disclosed herein are related to waveform design and signaling for energy harvesting (e.g., downlink energy harvesting) in a wireless network.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Representative Communications Network

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
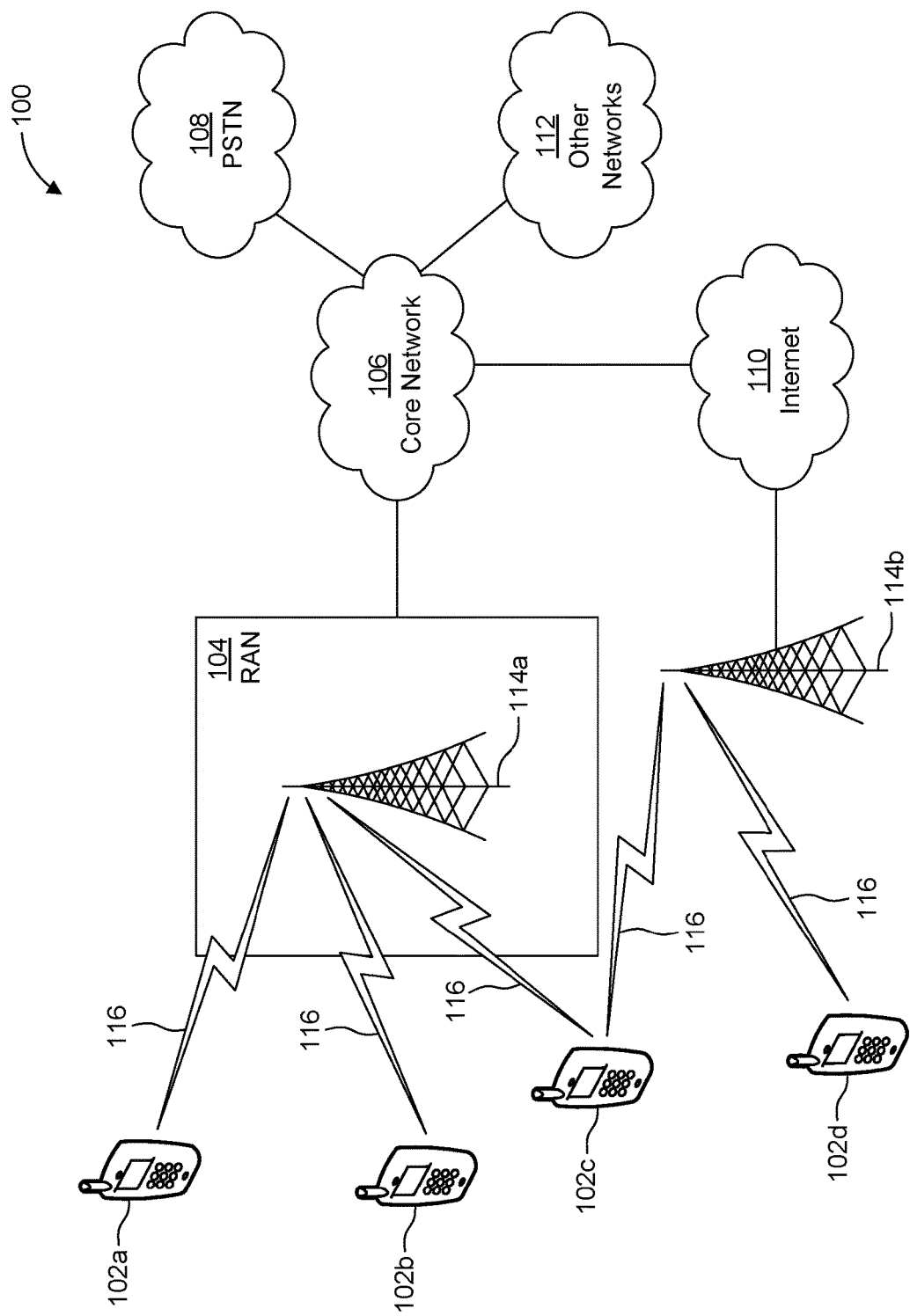
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
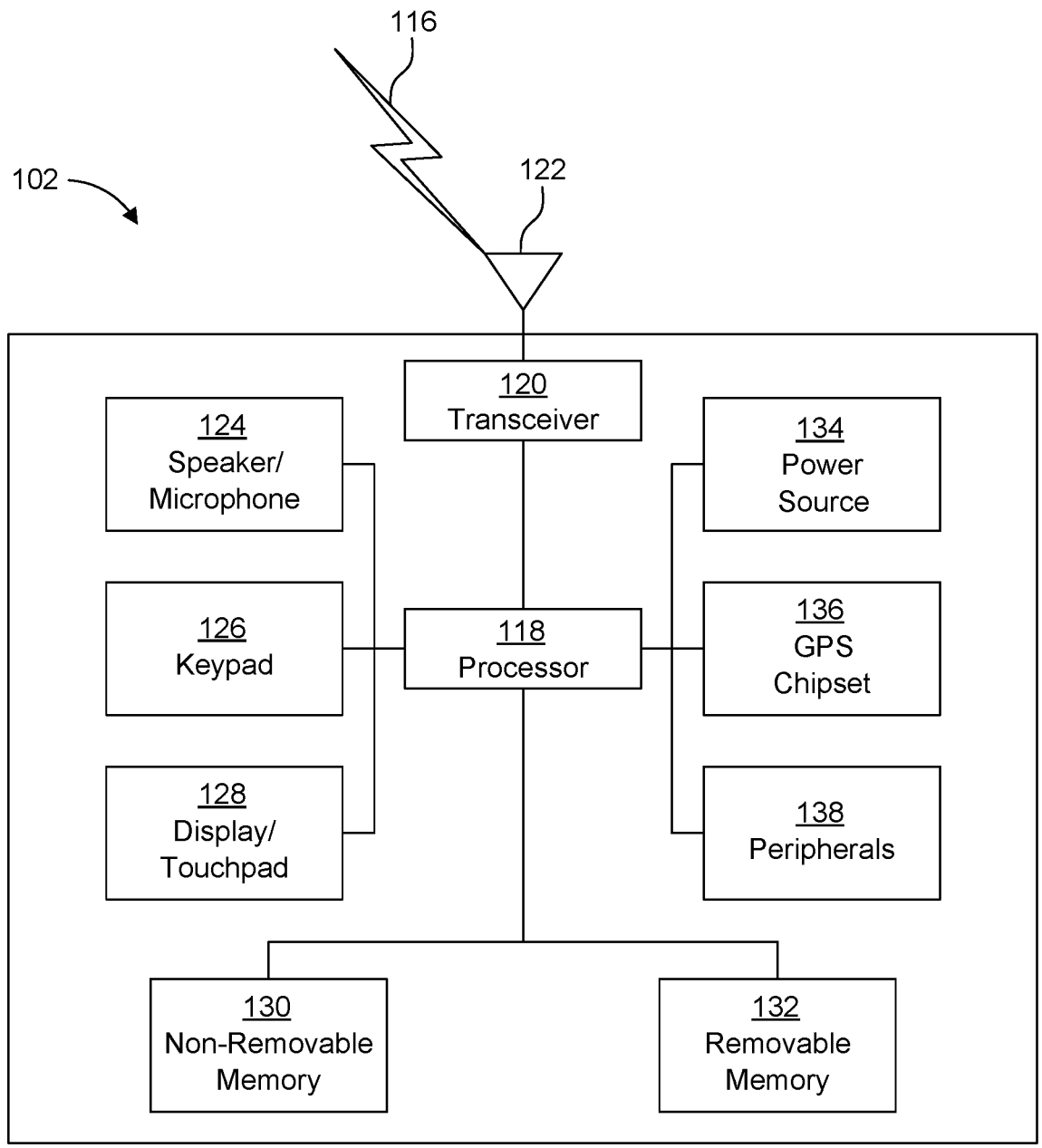
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
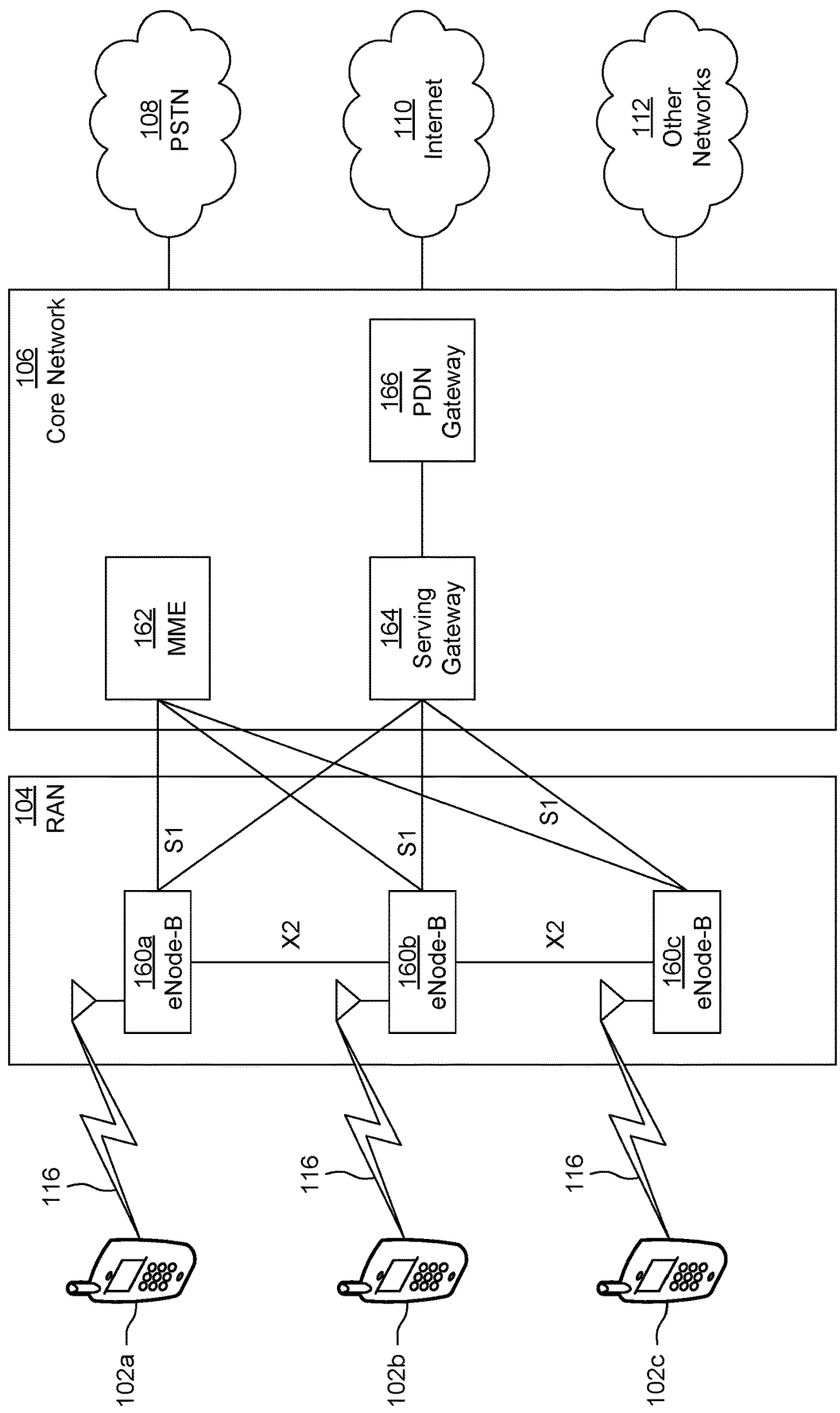
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In some representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
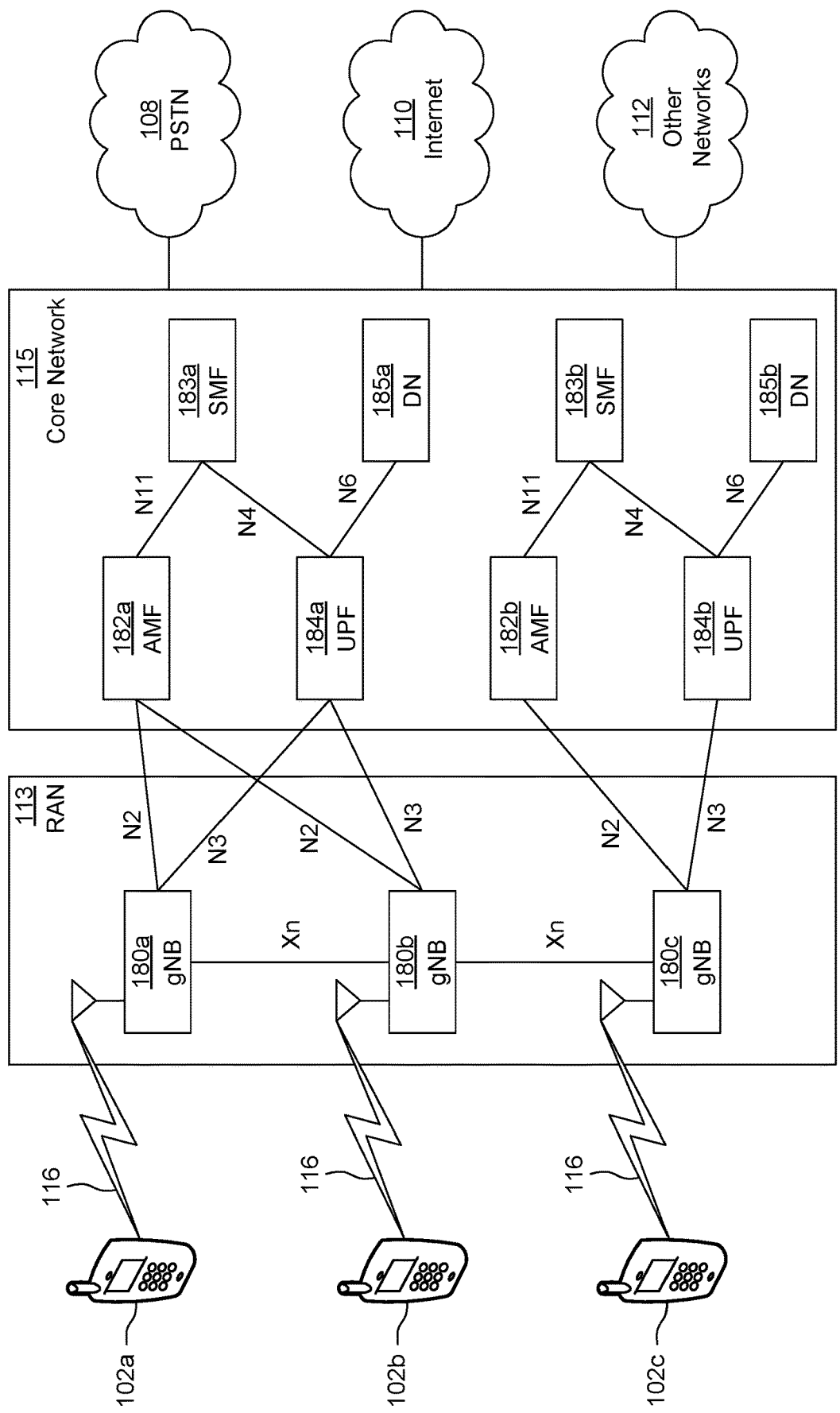
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating a WTRU or UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Energy Harvesting

In state-of-the-art wireless technology such as cellular and WLAN, RF front ends are usually a mix of passive and active components. For example, passive components may include Rx antennas, Tx/Rx path switches and filters. These components require little, if any, power to function. On the other hand, active components require power to function. For example, an oscillator (to tune frequency to the carrier frequency), a low noise amplifier, and/or analog-to-digital (A/D) converters (or ADCs) in the Rx path are active components (see, e.g., Refs. [1] and/or [2]).

Advances in RF component design over the past several years have made it possible to use novel types of RF circuitry that can process received RF waveforms, which are collected through the antenna front-end by the receiving device/component, to harvest energy from the received RF waveforms for use in powering circuitry in the absence of an active power supply. For example, such a device/component may harvest energy from the received RF waveform with reasonable efficiency to store it (e.g., in a battery, capacitor, or other energy storage device) for subsequent use cases or may use it directly to run the necessary circuitry to process received signals. These passive receivers use RF components such as Schottky diodes or micro-electro-mechanical system (MEMS) RF transformers to implement the functionality required for voltage amplification, multiplication, and signal rectification. Passive receivers may operate in the antenna far-field and may support reasonable link budgets. For example, passive receivers may support wireless communications over long ranges. In various embodiments, the terms passive receiver, energy harvesting (EH) device, and zero-energy (ZE) receiver, may be used interchangeably.

Figure 2:
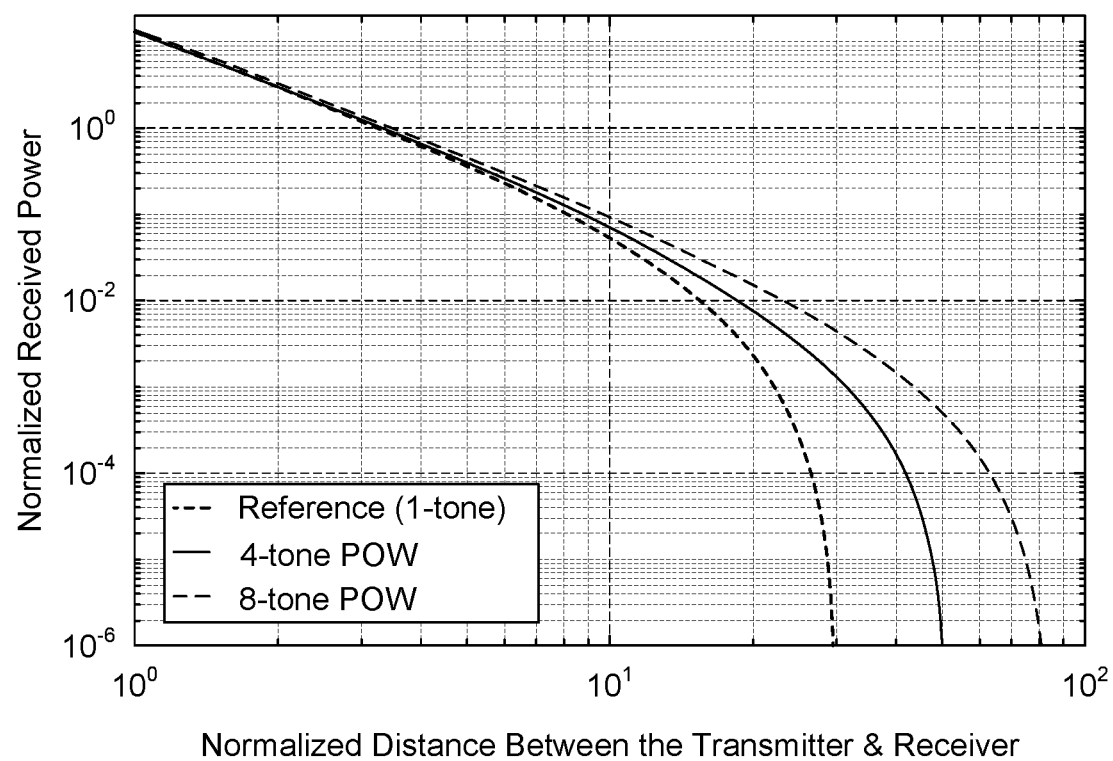
FIG. 2 is a graph showing exemplary power received by a rectification diode-based energy harvesting device as a function of distance and waveform, according to one or more embodiments.

Operational range and energy harvesting efficiency are important characteristics of a passive receiver. The power received by a rectification diode-based energy harvesting device as a function of distance, with respect to the EH signal transmitter, and type of transmitted waveform is illustrated in FIG. 2. It is seen that, for a desired received power level, the operational distance may be optimized by properly selecting the number of tones for a power optimized waveform (POW).

Figure 3A:
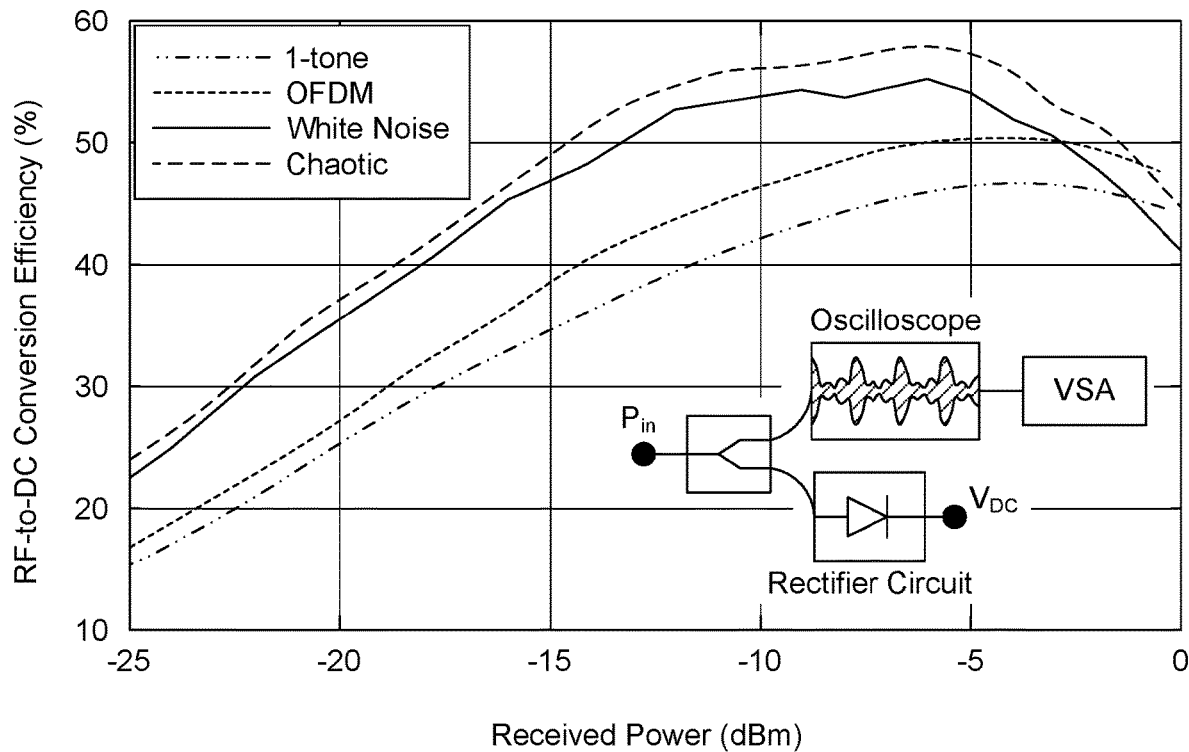
FIG. 3A a is a graph showing exemplary conversion efficiencies of a rectification diode-based device as a function of received power and waveform, according to one or more embodiments.
Figure 3B:
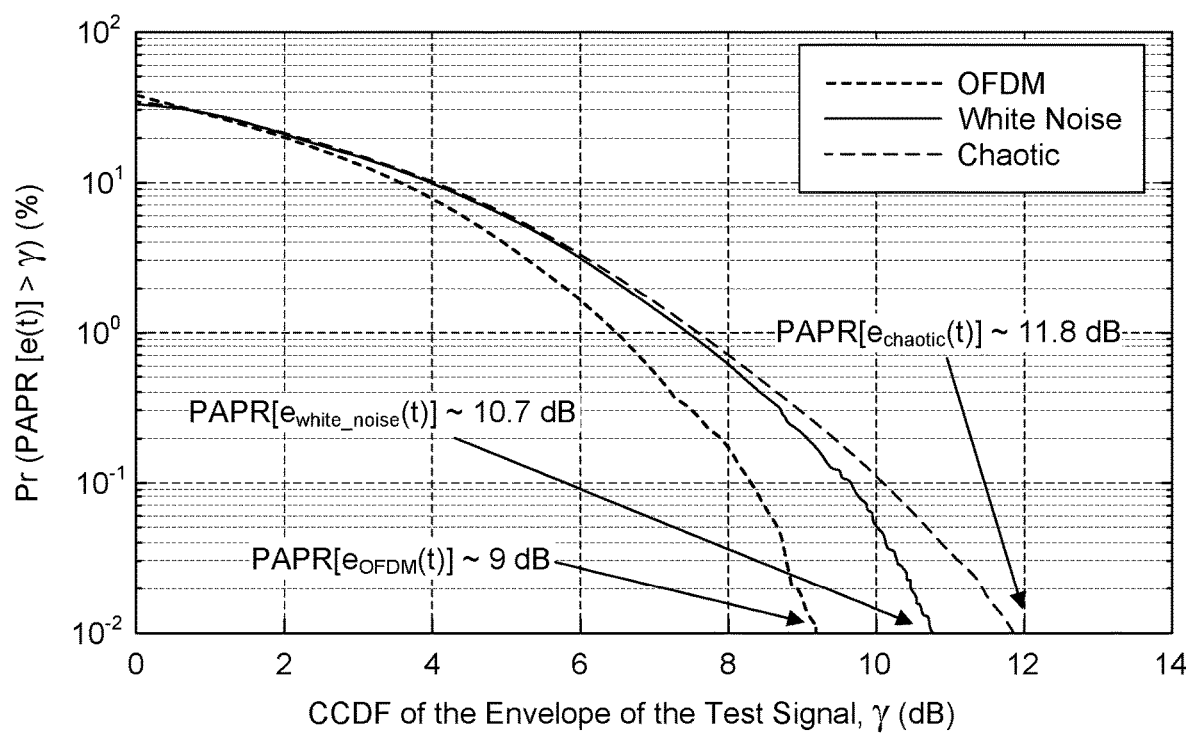
FIG. 3B is a graph showing an exemplary peak to average power ratio (PAPR) of a rectification diode-based device as a function of Complementary Cumulative Distribution Function (CCDF) of the envelope of a test signal, according to one or more embodiments.

The efficiency of a rectification diode-based energy harvesting receiver as a function of the received signal power and the type of received signal is illustrated in FIG. 3A. As illustrated in FIG. 3A, the highest level of RF to direct current (RF-to-DC) conversion efficiency is achieved with a chaotic signal. The peak-to-average power ratio (PAPR) of various test signals as a function of complementary cumulative distribution function (CCDF) of the envelope of the test signal is shown in FIG. 3B, which illustrates that a chaotic signal delivers the highest PAPR.

Figure 4:
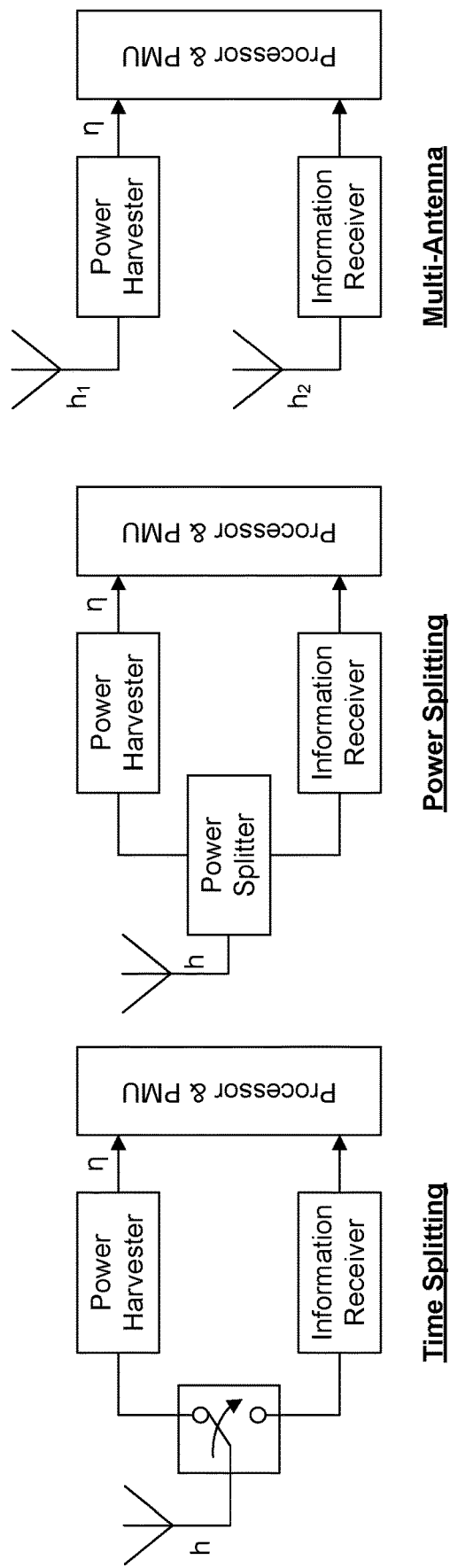
FIG. 4 depicts block diagrams showing three potential configurations of a receiver of an energy harvesting device, according to one or more embodiments.

FIG. 4 illustrates three different receiver configurations for receiving an information-bearing signal and retrieving the information from the signal while also harvesting energy from the signal. In an example, the information reception requirement of an information receiver that is collocated with an energy harvesting device may be satisfied by an appropriate power split, time split, or antenna separation, as illustrated in FIG. 4.

With the expected proliferation of Internet of Things (IoT) devices and envisioned applications that may require their deployment in the environment or in hard-to-reach places, it is infeasible to assume the applicability of the conventional battery recharging/replacement methods for powering such devices. It might also be cost and time inefficient to replace such devices. Therefore, energy harvesting is expected to become an indispensable feature supported by many IoT devices. The support of this feature can also be extended to other types of wireless devices (such as wearables, small factor handsets, implantable devices) for the purpose of battery life extension and/or to alleviate the burden of frequent conventional battery recharging or replacement.

The amount of IoT WTRU device deployment is expected to reach very large numbers in the coming years. A natural question to ask is whether one can leverage this massive scale transmission and/or reception of such devices to harvest energy. There are a variety of downlink reference signals (e.g., in 3GPP standards), as well as other periodic transmissions, such as those associated with the Physical Broadcast Channel (PBCH), that can be used by wireless devices for the purpose of energy harvesting. However, the periodicity and duration of each of those transmissions may not be sufficient to guarantee a reasonable/meaningful level of energy transfer. For example, transferring 20% of current battery capacity of a WTRU over 30 minutes may be considered as a reasonable or meaningful level of energy transfer.

In some examples, the waveform of conventional reference signals is not designed with consideration of its impact on energy harvesting efficiency, which may affect the applicability of using conventional reference signals to transfer energy in a wireless system.

As such, new or improved forms (or designs) of reference signals are desirable to guarantee a meaningful level of energy transfer within a certain period of time, having optimized waveforms for the purpose of energy transfer.

Disclosed herein are various methods, apparatus, and systems whereby signaling between network infrastructure and one or more energy harvesting IoT or WTRU devices can help in the optimization of energy transfer by allowing the IoT or WTRU devices to tune their energy harvesting components to maximize energy harvesting and/or minimize power consumption (e.g., minimize attempting to harvest energy during silence periods).

Note that the term "legacy WTRU" (and alike) is used herein to refer to any WTRU from which an energy harvesting WTRU may harvest energy, and is not intended to imply that the "legacy WTRU" itself may not be another energy-harvesting-capable WTRU. Furthermore, as used herein, a WTRU may be a device that has only receive capabilities, has only transmit capabilities, or has both transmit and receive capabilities. For instance, it is presumed that many IoT devices may be only transmit devices or only receive devices.

In various embodiments, multi-mode devices may be defined as WTRUs that are equipped with passive receivers, and may be multi-mode RAT devices supporting one or more of: 2G GSM/EGPRS, 3G WCDMA/HSPA, 4G LTE/eMTC/NB-IoT, and 5G NR.

In various embodiments, an energy harvesting (EH) device or component in a WTRU (e.g., an EH WTRU or UE) may operate in-band and/or on a dedicated band. In an example, in-band operation may refer to EH signaling for EH devices carried inside or in a portion of an operating band/frequency channel where the main modem receiver operates for purposes of communicating data (including control signals and user data) with other nodes of a network. Dedicated band operation may refer to EH signaling carried in a frequency channel distinct from the main modem cellular (DL and/or UL) transmissions.

In various embodiments, EH device capability may include supporting one or more energy harvesting mechanisms. For example, an EH device may support wideband, fixed or configurable narrowband energy harvesting. In another example, the device may be a waveform agnostic or waveform optimized energy harvester. In some examples, multiple EH device capabilities (or energy harvesting mechanisms) may be dependent or independent of each other. For example, the WTRU may perform configurable energy harvesting (e.g., being equipped with a EH device/component tunable to harvest energy (e.g., at a center frequency $f_c$) over a maximum bandwidth B), or fixed energy harvesting (e.g., multiple (e.g., on/off switchable) EH devices/components each being tuned to a fixed center frequency $f_i$). In various embodiments, the EH device may achieve the maximum energy harvesting efficiency by receiving a single sinusoid waveform (over a single tone/subcarrier) or it may require a minimum of $N_t$ tones to receive a waveform with sufficient PAPR.

In various embodiments, the amount of energy an EH-capable device can harvest may be determined (e.g., approximately determined) as follows:

$$E_h \approx \eta \beta \alpha \times B \times P_{rx} \times T \qquad \text{Eq. (1)}$$

where B defines the supported EH bandwidth by the device, $P_{rx}$ defines the average power density received by the device, T is the total time used for EH, $\eta$ is defined as the device energy harvesting efficiency, $\beta$ is the ratio between a bandwidth allocated by the network for EH and the supported EH bandwidth by the device, and $\alpha$ is the ratio between the time period where there is an active power transfer to the EH device and the total time used for EH. For example, for a WTRU to harvest $E_h$=2 Joules within T=15 second with an efficiency $\eta$=80% and a harvesting bandwidth B=1 MHz, the network can set the values of $\beta$=1 and $\alpha$=0.37 assuming the network (e.g., a base station, an eNB, or a gNB) uses a maximum power of 43 dBm over 10 MHz bandwidth, and the total loss (e.g., pass loss) between the network and EH device is 30 dB. In some cases, there may be an energy penalty associated with an EH device when the EH device is switched on.

Energy Harvesting (EH) Resource Dedication Mechanisms

In various embodiments, an EH signal waveform may be generated at the network (e.g., a base station, an eNB, or a gNB) using control, data, existing and/or dedicated reference signaling to help guarantee a minimum level of energy harvesting for EH capable devices. In an example, the EH dedicated reference signaling may be used or enabled according to a specific schedule and/or generated according to one or more of: resource block (RB)-based resource dedication, resource element (RE)-based resource dedication, and overlaid EH signal design.

In various embodiments, the choice (or selection) from one of the aforementioned resource dedication methods might be based on the percentage $\beta$ of bandwidth B and ratio $\alpha$ that are required to transfer an amount $E_h$ of energy to an EH device within time T subject to eNB knowledge of currently and/or potentially scheduled DL control/data transmissions and density/periodicity of various reference signals, for example, one or more synchronization signal blocks (SSBs) and/or channel state information (CSI) reference signals (CSI-RSs).

In various embodiments, with regard to RB-based resource dedication, the network (e.g., an eNB or a gNB) may dedicate one or more, consecutive or non-consecutive, RBs for the sole purpose of energy transfer where the number of RBs might be dependent on the EH device capability, e.g., bandwidth and/or energy harvesting efficiency associated with the supported waveforms, the defined EH schedule and the required minimum energy to be transferred. This form of resource dedication may be suitable for eNBs serving several legacy WTRUs that do not support new types of reference signals and, at the same time, the density of transmissions within the energy harvesting band does not guarantee the minimum level of energy transfer to the EH device within the required time duration. Therefore, this method can provide backward compatibility to legacy WTRUs not supporting the EH feature.

In various embodiments, with regard to RE-based resource dedication, the network (e.g., an eNB or a gNB) may dedicate one or more REs distributed uniformly or non-uniformly across one or more RBs, depending on the support of served WTRUs to the EH dedicated resource signaling, for the sole purpose of energy transfer. The number of dedicated REs and their distribution over the wireless band can also be dependent on the EH device capability, for example, bandwidth and/or energy harvesting efficiency associated with the supported waveforms, the defined EH schedule and the required minimum energy to be transferred. This form of resource dedication is suitable for eNBs serving WTRUs that support reference signals associated with EH as a new feature. RBs populated by EH dedicated REs can still be allocated to WTRUs supporting EH feature for the purpose of DL control/information transmission.

In various embodiments, with regard to overlaid EH signal design, in this form of EH resource dedication, the network (e.g., an eNB or a gNB) does not have to dedicate time and/or frequency resources for the sole purpose of energy transfer. Alternatively, it can superimpose an EH signal over a base information signal using a subset or the full set of REs dedicated for one or more information signals and according to an EH signal transmission schedule.

Mechanisms of EH Signal Transmission Scheduling

In various embodiments, the dedicated EH signal may be generated according to a specific schedule to guarantee the transfer of a minimum energy $E_h$ within a certain duration T. For example, the network may guarantee the transmission of a minimum amount of power within a fixed/dynamic narrowband or a wideband that is associated with either DL and/or UL according to one or combination of the following schedule characteristics such that Eq. (1) is satisfied, where the transmission power at each time unit (e.g., OFDM symbol, mini-slot, slot, subframe, frame) can be fixed or variable.

For example, multiple schedule characteristics are disclosed herein. Transmission over N consecutive time units that is repeated every M time units for a total duration T. Transmission every $N_1^{th}$ time unit over $N_2$ consecutive time units that is repeated every M time units for a total duration T. Transmission over $N_1$ random or defined time units within $N_2$ consecutive time units that is repeated every M time units for a total duration T.

The purpose of the schedule may be to limit/manage the overall network power consumption and/or to prevent the degradation of the network spectral efficiency due to the dedication of some of the resources for the sole purpose of energy transfer. In some cases, the network may be responsible for schedule optimization to achieve the aforementioned goals.

In various embodiments, the EH device can tune its components to harvest energy only during the defined schedule for dedicated EH signaling or keep trying to harvest energy from alternative signals that might probably be available/scheduled within the same fixed/dynamic narrowband or wideband that is associated with either DL or UL for other purposes such as DL/UL control and data.

Waveform Design

In various embodiments, the energy harvesting waveform design flexibility may be subject to the format and amount of resources dedicated for energy harvesting. Design option may be dependent on the dedicated resources as well as the targeted network performance goal, e.g., increasing the efficiency of EH devices, and/or maximizing the network spectral efficiency subject to minimum energy harvesting efficiency.

In various embodiments, with regards to RB-based resource dedication, due to the ability of the eNB (or gNB or other form of base station) to dedicate a set of RBs that can span a considerable part or all of the energy harvesting band, the eNB has more flexibility/degrees of freedom in the design of the EH waveform. The waveform design can take the EH signal transmission schedule into account. The eNB may consider, among other options, one or more of the following waveform generation strategies depending on the EH device capability, e.g., bandwidth and/or energy harvesting efficiency associated with the supported waveforms. For example, 1) distribute power uniformly among all the subcarriers within the allocated RBs, and for every time unit identified in the EH transmission schedule during the transmission period T. 2) Distribute power uniformly across the subcarriers within the allocated RBs, but consider some other predefined distribution across the time units identified in the EH transmission schedule during the transmission period T. 3) Consider a predefined power distribution across all the subcarriers within the allocated RBs, and uniform distribution across the time units identified in the EH transmission schedule during the transmission period T. And 4) consider a predefined power distribution across the subcarriers within the allocated RBs, but consider some other predefined distribution across the time units identified in the EH transmission schedule during the transmission period T.

In various embodiments, the allocation of power may be uniform across one or a subset of the subcarriers within the allocated RBs for N consecutive slots that is repeated every M slots for a total duration T.

The distribution of power across the subcarriers should be constrained by the amount of interference it can generate at nearby RBs that are not dedicated for energy harvesting and that are allocated for other purposes, e.g., DL control and/or data transmission to the same WTRU (e.g., a WTRU equipped with EH circuitry) or another WTRU.

An eNB may select the set of RBs for energy harvesting, configure the EH signal transmission schedule, and design the EH signal waveform such that it can efficiently exploit the currently configured DL synchronization and/or reference signals. For example, the eNB can dedicate a total of 2 RBs in the range of 20 RBs associated with an SSB over a duration of a single slot that is repeated every 5 ms (e.g., 5 slots assuming 15 KHz subcarrier spacing (SCS)) for a total duration of 5 s where SSB transmission periodicity is 20 ms. In this example, the EH signal waveform design will be constrained to the slots occupied by an SSB where 4 OFDM symbols in each slot will be dedicated for the SSB transmission on a specific beam.

In various embodiments, with regard to RE-based resource dedication, the EH waveform design may be constrained by the dedicated EH RE density and distribution across the potential energy harvesting band, as well as the existence/non-existence of other control/data signaling in the REs surrounding the dedicated EH REs. The eNB may consider, among other options, one or more of the following waveform generation strategies: 1) distribute power uniformly across all the dedicated EH REs over the EH transmission schedule during the transmission period T; 2) consider a uniform distribution of power across EH REs in the frequency domain, and some predefined fixed power distribution across the time units identified in the EH transmission schedule during the transmission period T; 3) consider a predefined fixed distribution of power across EH REs in the frequency domain, and the same or different predefined fixed power distribution across the time units identified in the EH transmission schedule during the transmission period T; and 4) distribute power across the EH REs, over one (or more) time unit(s) identified in the EH transmission schedule during a transmission period T, such that the MSE between the generated PSD and one that is chosen from a set of predefined PSDs associated with some desired EH waveforms is minimized.

The distribution of power across the dedicated EH REs should be constrained by the amount of in-band interference they can generate within their RBs that might be allocated for other purposes, e.g., DL control and/or data transmission to the same WTRU (e.g., a WTRU equipped with EH circuitry) or another WTRU.

An eNB can select the set of REs, configure the EH signal transmission schedule, and design the EH signal waveform such that it can efficiently exploit the currently configured DL synchronization and/or reference signals. For example, the eNB can dedicate 2 REs in each of 6 consecutive RBs as part of a BWP configured for one of the served WTRUs over a duration of a single slot that is repeated every 5 ms (e.g., 5 slots assuming 15 KHz SCS) for a total duration of 5 s where CSI-RS are assumed to occupy the same set of REs in each RB over 4 consecutive OFDM symbols and their transmission is configured to occur every 5th slot periodically. In that example, the EH signal waveform design will be constrained to the 4 consecutive OFDM symbols occupied by CSI-RS.

In various embodiments, with regard to overlaid EH signal design, an EH signal can be designed as an overlay to a base information signal, the information signal can be intended for the same device employing an in-band EH device or a device other than the targeted EH device. The overlaid EH signal can be generated using one or more of the following strategies: 1) a simple boost of power, as a multiplicative factor that is predefined and/or configurable for a subset or the full set of REs/RBs/RBGs associated with one or more information signals destined for one or more legacy and/or new WTRUs; 2) a frequency-domain superposition of an EH sequence and one or more information signals over a subset or the full set of REs/RBs/RBGs associated with that/those information signal(s). A fixed power ratio between the EH signal and information signal may pre-defined and/or configurable; 3) a time-domain superposition of an EH sequence and one or more information signals, where the generated EH sequence is guaranteed, by direct generation properties or filtering, to span one or more contiguous set of REs/RBs/RBGs associated with that(those) information signals. A fixed power ratio between the EH signal and information signal is pre-defined and/or configurable.

This form of signal design can include, as a special case, the scenario where the information signal itself can be used for the purpose of energy transfer without any modification. That case may increase the system spectral efficiency potentially at the expense of the energy harvesting efficiency of the served EH device(s).

EH and Signaling Procedures

Figure 5:
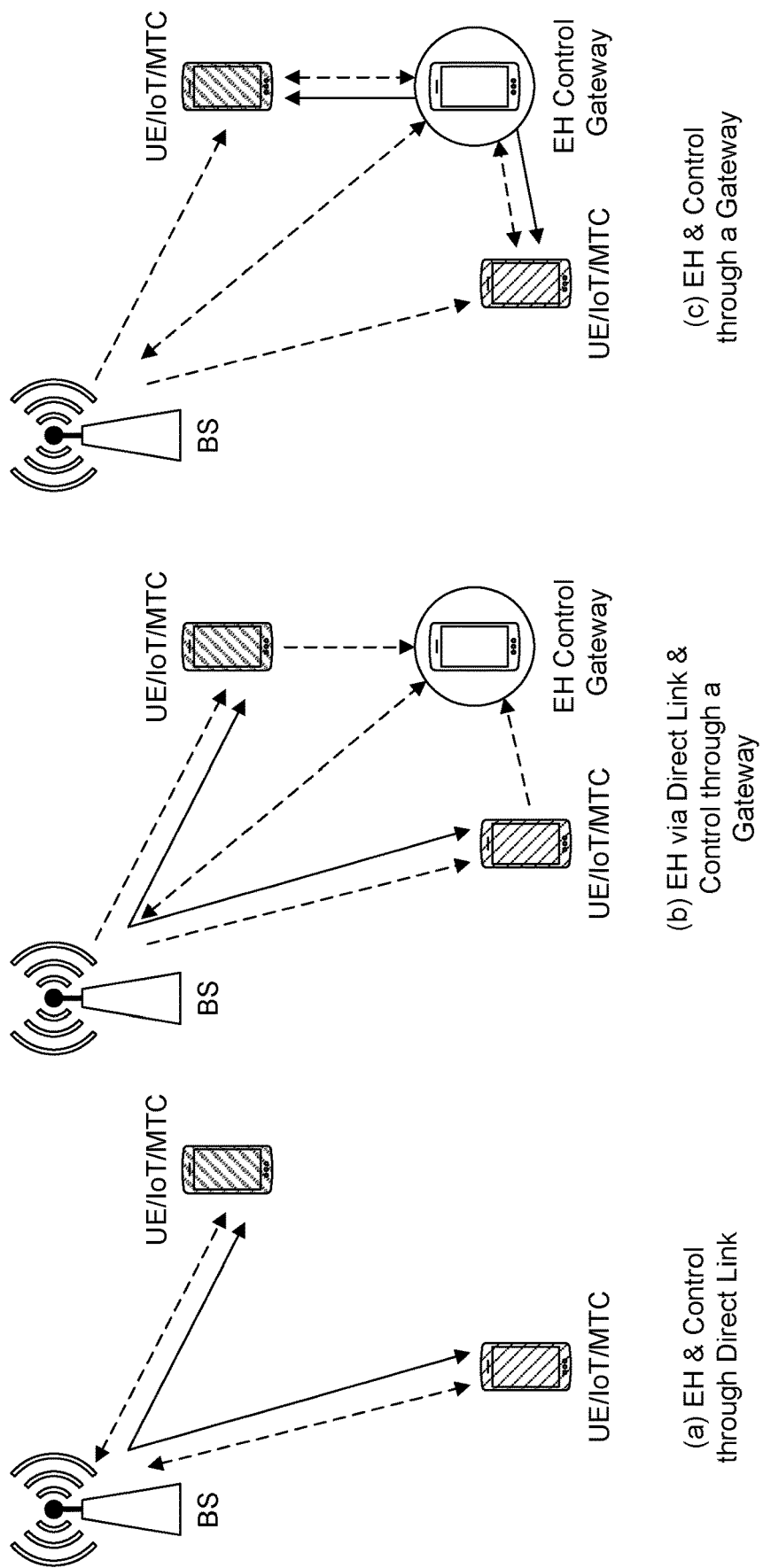
FIG. 5 illustrates an example of performing energy harvesting and control signaling in a wireless network, according to one or more embodiments.

In various embodiments, control signaling methods described herein may cover any of the following three implementations (depicted in FIG. 5): 1) direct link EH, control signaling and feedback; 2) direct link EH and signaling, and gateway-based feedback; and 3) direct link signaling, and gateway-based EH and feedback. The gateway may be a dedicated EH and/or control gateway device deployed by users or a regular UE/device, potentially characterized by a high battery capacity or currently possessing significant battery level, that is elected to serve as gateway by a group of devices within its vicinity. In an example, Implementation (c) in FIG. 5, in which the EH gateway is capable of transferring energy to other WTRUs, might be enabled when the gateway is a dedicated device that is equipped with a high capacity battery or has direct access to a power source. In various embodiments, whether or not Implementation (c) for a WTRU-based gateway can be used may depend on the WTRU's (the potential WTRU-based gateway) configuration, capability, and/or connection conditions between the WTRU and one or more potentially served EH-WTRUs. In various embodiments, EH gateway may be considered as a relay. In some examples, the EH WTRU may not be aware of the existence of the EH gateway. In some examples, the link(s) between BS and EH gateway may be considered as a relay link(s).

Figure 6:
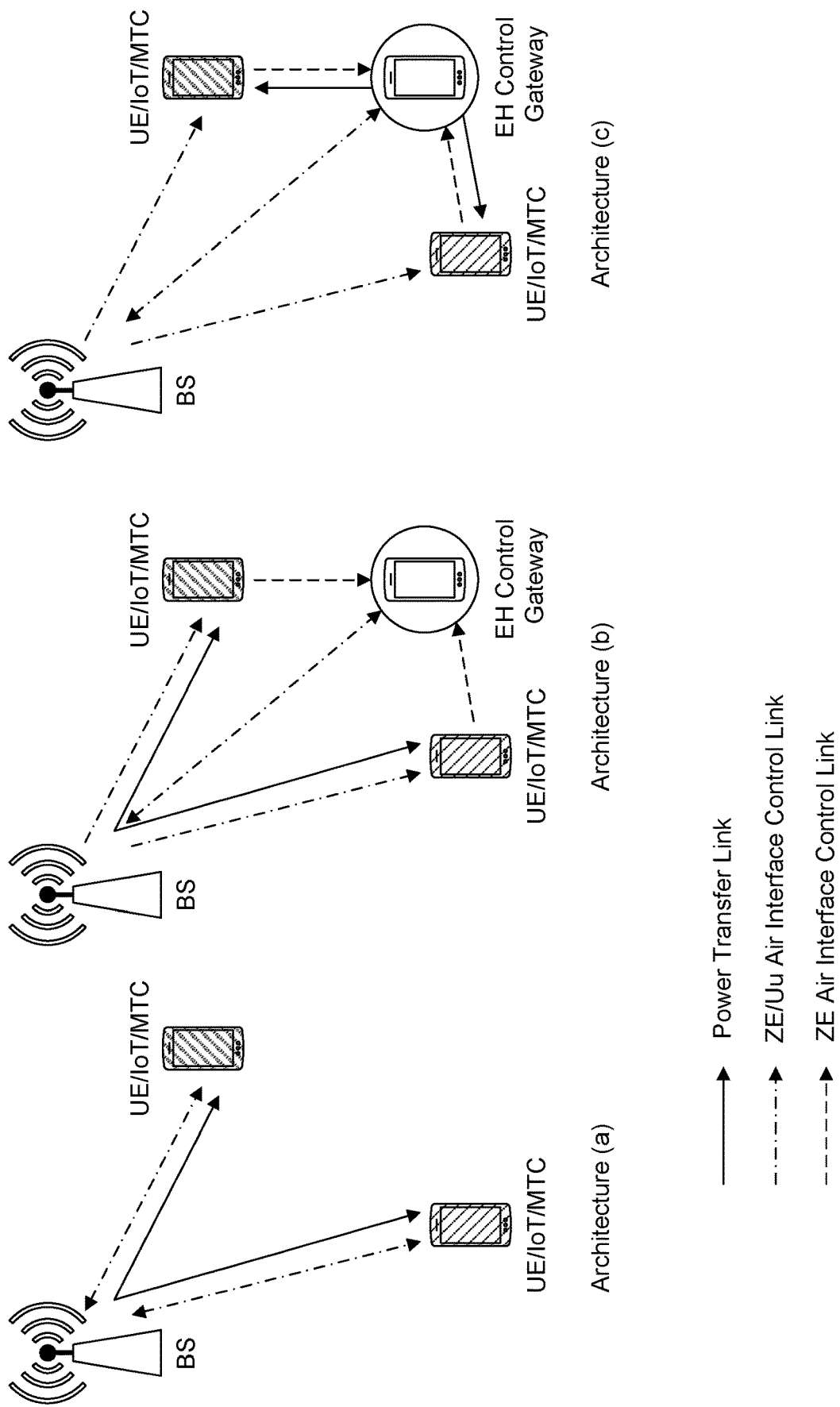
FIG. 6 illustrates an example of performing energy harvesting and control signaling in an RRC Connected state, according to one or more embodiments.
Figure 7:
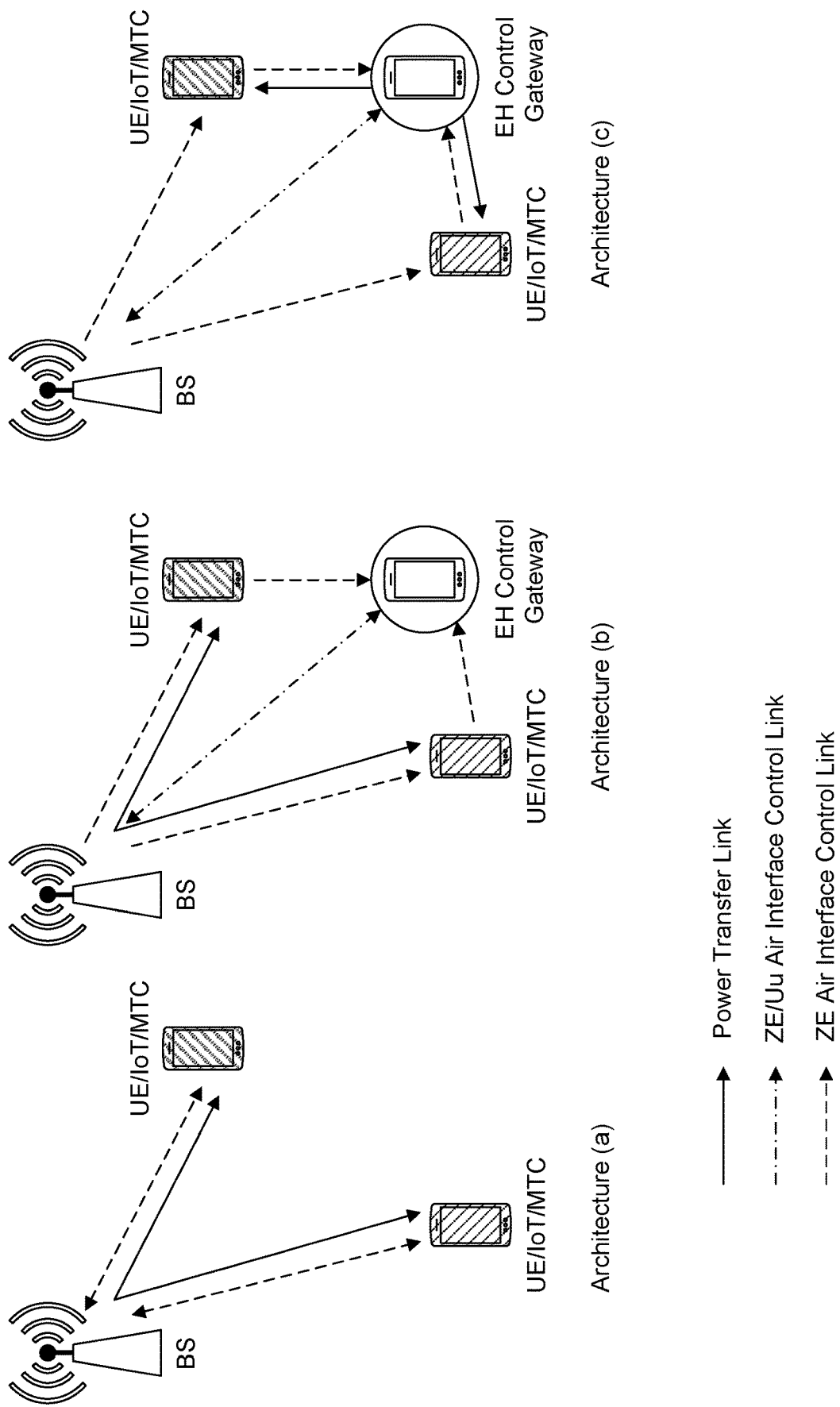
FIG. 7 illustrates an example of performing energy harvesting and control signaling in an RRC Inactive/Idle state, according to one or more embodiments.

For the described procedures, the type of control link will potentially be dependent on the RRC state(s) of the WTRU(s). For example, for WTRU(s) in "RRC Connected" state, control signaling between the BS and WTRU(s) can be carried out over either of the air interfaces (ZE/Uu), but feedback signaling from WTRU(s) to the gateway should generally be performed over the ZE air interface using backscattering, as shown in FIG. 6. On the other hand, for WTRU(s) in "RRC Inactive/Idle" state, control signaling for the purpose of energy harvesting should not significantly change the RRC/power state of served WTRU(s) to ensure that WTRU(s) will not be penalized by EH signaling and control. Therefore, control signaling and feedback are performed over the ZE air interface with backscattering or potentially power-boosted backscattering techniques, as shown in FIG. 7. In various embodiments, a ZE air interface is a low-energy consumption link.

Network-WTRU/Device Signaling

The introduction of the EH feature with dedicated resource allocation might necessitate the introduction of control signaling in the form of RRC, MAC, and/or L1 signaling between eNBs and the network to maximize the benefits from the EH feature. An EH device may use one or more of the following information/messages to communicate with the network (e.g., an eNB or a gNB).

a) A message requesting a minimum of $E_h$ Joules to be transferred within a certain period T.

b) A message defining/reporting the EH device harvesting capability/parameters, e.g., the minimum and/or maximum harvesting bandwidth, RF-to-energy conversion efficiency, and/or waveforms supported.

The network (e.g., an eNB or a gNB), on the other hand, may use one or more of the following information/messages to communicate with the WTRU/WTRU device(s).

A response granting/rejecting an energy transfer request.

A response granting a conditional energy transfer request subject to different energy harvesting parameters, e.g., the minimum number of Joules and/or the duration of energy transfer.

A message providing information about the EH dedicated signal transmission schedule.

A message identifying a set of one or more carrier frequencies and the associated bandwidths that can be considered for energy harvesting within the network.

A message specifying the EH dedicated signal range of allocated RBs within a specific LTE/NR frequency band along with the subcarrier configuration.

A message specifying the main/most important features associated with the waveform to be generated for energy harvesting, i.e. mean power, peak-to-average power ratio, etc.

A message providing information about the potential resource utilization outside the EH schedule and/or allocated RBs/configured bandwidth.

The network (e.g., an eNB or a gNB) may use one or more of the following information/messages to served information receivers scheduled over part or all of the EH dedicated resources as control signaling in the form of RRC, MAC, and/or L1 signaling.

Configuration/location of EH signal REs within the scheduled RB(s), if they occupy resources additional to legacy synchronization and/or reference signals.

Configuration/location of EH signal REs within the scheduled RB(s), if they overlap with REs dedicated for the information signal, i.e. PDSCH, NPDSCH.

EH signal generation configuration and/or parameters, e.g. time-domain or frequency-domain based signal(s), sequence type(s).

The purpose of the EH-related control signaling to served information receiver(s) is to facilitate and/or improve the information decoding process/performance at that information receiver(s). The overlaid EH signal characteristics can be agnostic to the information receiver and treated as interference, or can be chosen from a set of potential design options, with fixed or configurable parameterization, that are known to the information receiver. The first method may be suitable for legacy devices, whereas the second method may be suitable for new devices supporting the EH feature. In the case of overlaid signal design, the network (e.g., an eNB or a gNB) may decide to convey only partial information (about how the EH signal is generated) to help the information receiver(s) to determine how to treat the received information. For example, the network may support multiple EH signal configurations, e.g., one configuration that is optimal for each of the multiple served EH WTRUs, within the same frequency/time resources scheduled for an information receiver. The network may decide to convey only information (e.g., about a subset of the EH signal configurations), and let the information receiver treat the rest information as interference.

Network Control Signaling

In various embodiments, one or more of the information elements (IEs) required to support the EH feature can be conveyed to the EH device explicitly, using dedicated fields in an existing control message format or using new dedicated control messages, or implicitly based on the transmission configuration associated with one or more of the EH control messages.

Explicit EH control signaling can occur over a ZE air interface (e.g., referring to [1][2]), or over the main transceiver link between the eNB and the WTRU, e.g., Uu air interface. More generally, a combination of ZE air interface and Uu air interface control signaling can occur between the eNB and a specific WTRU deploying an EH capable device.

Network Signaling over ZE Air Interface

The eNB/network and served EH WTRU(s) can exploit the ZE air interface to minimize the power consumption requirements during the exchange of control signaling for the purpose of energy transfer such that the overall energy transfer/harvesting efficiency is maximized. The ZE air interface might be particularly important/efficient when the WTRU is in IDLE or INACTIVE mode.

The ZE control signal can be transmitted in-band or over a dedicated band, and/or one or more of the following transmission characteristics can be assumed known or pre-configured at the EH device [3].

Transmission duration(s), such as absolute time duration or relative time duration compared to a reference value;

Transmission format, such as modulation scheme and its parameterization, modulation order, number and/or placement of tones, sequence and make-up of the ZE waveform part comprised as part of a transmission;

Power profile, such as peak power, average power, a value representative of first or N-th order power distribution profile statistics such as PAPR including the possibility of adjustment factors when calculating these;

Transmission settings in use by the transmitter of the ZE control signal, such as frequency location, transmission patterns or sequences if one or more transmission parameters are changed to randomize interference contributions and/or to improve robustness of transmissions.

Transmission characteristics associated with a ZE control signal waveform may be pre-configured and known in the WTRU. Or, these transmission characteristics may be signaled and configurable in the WTRU. For example, network nodes such as an MME or eNB may use control signaling in the form of NAS, RRC, MAC CE or L1 signaling to configure and/or indicate transmission formats for the purpose of EH control signaling over a zero-energy air interface.

For example, a WTRU may receive the ZE air interface transmission configuration related to EH control signaling, e.g., transmission schedule, transmission duration and frame format, a unique ID and/or a group ID, while in CONNECTED mode over the Uu air interface in a first step. The eNB/network may, in a second step, use the ZE air interface and send a unicast and/or a multicast message to a single or group of WTRU(s) during the configured transmission schedule requesting feedback that conveys information about current individual battery levels or a statistical metric of those levels. In a third step, the addressed WTRU(s) may check its/their current battery level(s) against some threshold that can be defined by the network or be WTRU specific, and then decide whether feedback to the eNB/network requesting energy transfer is necessary or not. WTRU feedback options are described in a separate section herein.

Network Signaling over Uu Air Interface

The eNB/network and served EH WTRU(s) can use the legacy Uu air interface to exchange control messages related to energy transfer if the served WTRU(s) is (are) in CONNECTED mode and/or its (their) battery level(s) are above a specified threshold, which threshold can be an eNB/network-controlled parameter or a WTRU-specific parameter. The eNB/network can then convey EH related control signaling as additional configuration parameters by introducing new information element(s)/field(s) within existing DCI format(s) transmitted over PDCCH, NPDCCH, or MPDCCH. The eNB/network can also introduce totally new DCI format(s) to enable standalone EH configuration signaling over PDCCH, NPDCCH, or MPDCCH.

The eNB/network might also use the Uu air interface to convey essential configurations required to enable signaling over the ZE air interface as discussed earlier. These configurations may include one or more of the following parameters:

ZE transmission schedule where the WTRU should expect to receive EH related signaling ZE transmission characteristics and format as described earlier, i.e. transmission duration, modulation scheme and parameters, transmission band and frequency location.

A unique ID assigned to served WTRU to enable unicast control signaling.

A group ID assigned to a set of WTRUs served by one or more eNBs and that can be based on geographical location of the WTRUs.

WTRU/Device Control and Feedback Signaling

A WTRU in need of energy harvesting to replenish its battery might consider conveying control messages, i.e., energy transfer request with specific parameters, or providing feedback information in response to eNB/network control messages over a ZE and/or a legacy Uu air interface.

Feedback over ZE Air Interface

Figure 8:
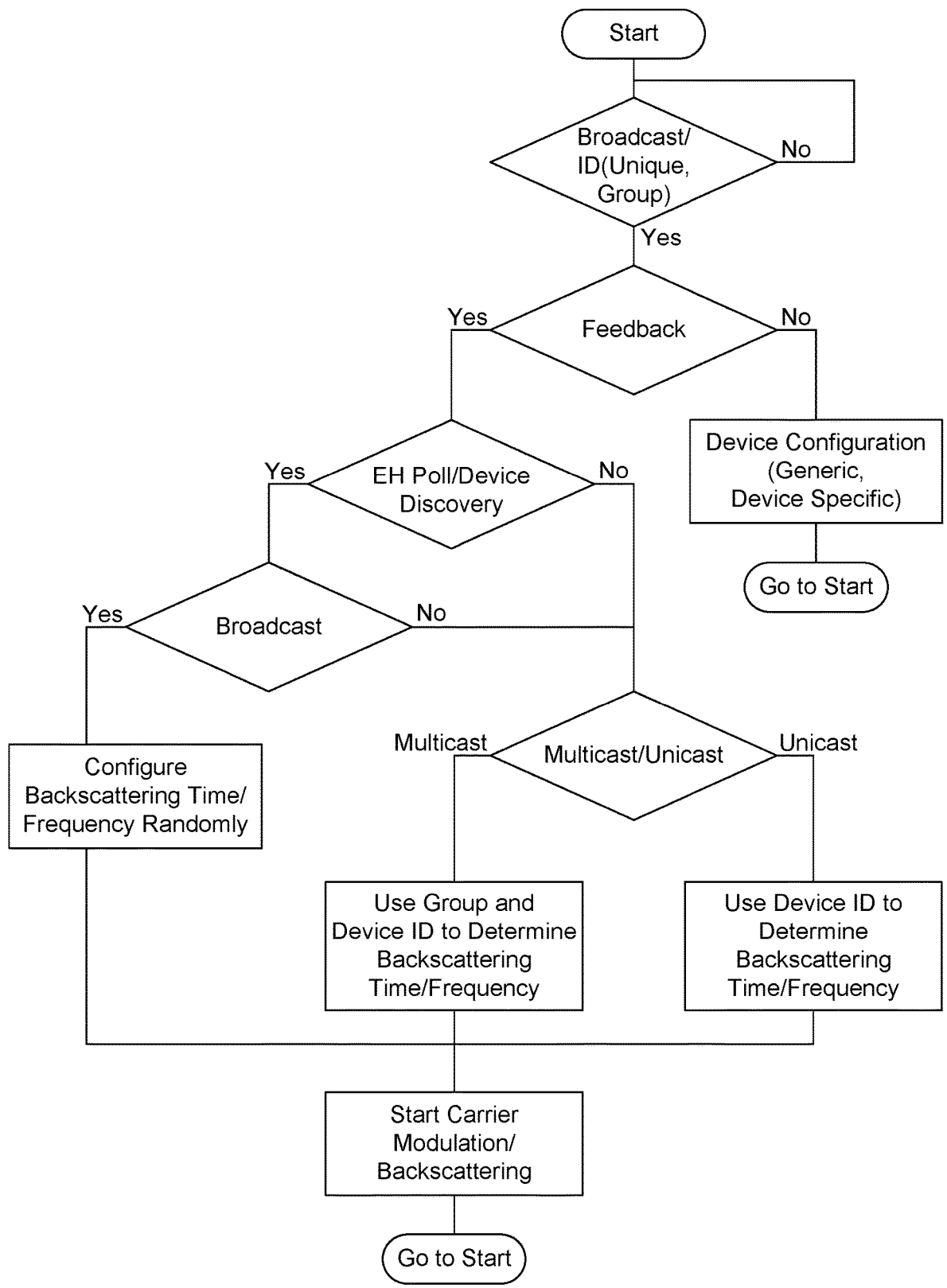
FIG. 8 is a flowchart illustrating an example of a WTRU using energy harvest (EH) device control message(s) for signal processing, according to one or more embodiments.

WTRU(s) can consider backscattering techniques (monostatic, bistatic, or ambient), potentially utilizing delta-sigma modulation method as an enabler of a high order modulation backscattering, over the ZE air interface to provide feedback to the serving eNB/network [4]. WTRU(s) may also use a combination of active and backscattering transmission where a WTRU may utilize its power source to boost the power of the backscattered signal to guarantee signal detection at the eNB. Backscattering techniques are generally suitable for feedback only and cannot be used to initiate control signaling from the WTRU, except for ambient backscattering which might not require dedicated carrier transmission/emission from the eNB but would potentially just enable short communication distances and without any transmission capability guarantee. These techniques, however, will alleviate the power consumption requirements in WTRU's UL transmissions which is particularly suitable for energy harvesting purposes. Energy transfer requests can be initiated using a poll message generated from the eNB/network with broadcast/multicast/unicast backscattering configuration followed by a carrier transmission. FIG. 8 introduces a flowchart that describes potential WTRU actions, regarding feedback transmission configuration, based on a subset of the potential control messages to be received from the eNB/network.

The WTRU can determine when it is supposed to modulate a backscattering signal initiated from the serving eNB based on the reception of a ZE control message, e.g., from the serving eNB/network, characterized by one or more of the following options:

Reception of a ZE control message that occurs according to a transmission schedule configured over a ZE or a Uu air interface.

The ZE control message may contain the WTRU unique ID and a feedback request followed directly by a carrier transmission.

The ZE control message may contain the WTRU unique ID, a feedback request, and a time offset indicating the relative time compared to a reference value, e.g., end of the ZE control message or beginning/end of the frame containing the control message, until a carrier transmission starts.

The ZE control message may contain the WTRU group ID and a feedback request followed by a carrier transmission.

The ZE control message may contain the WTRU group ID, a feedback request, and a time offset indicating the relative time compared to a reference value, i.e. end of the ZE control message or beginning/end of the frame containing the control message, till a carrier transmission starts.

Figure 9:
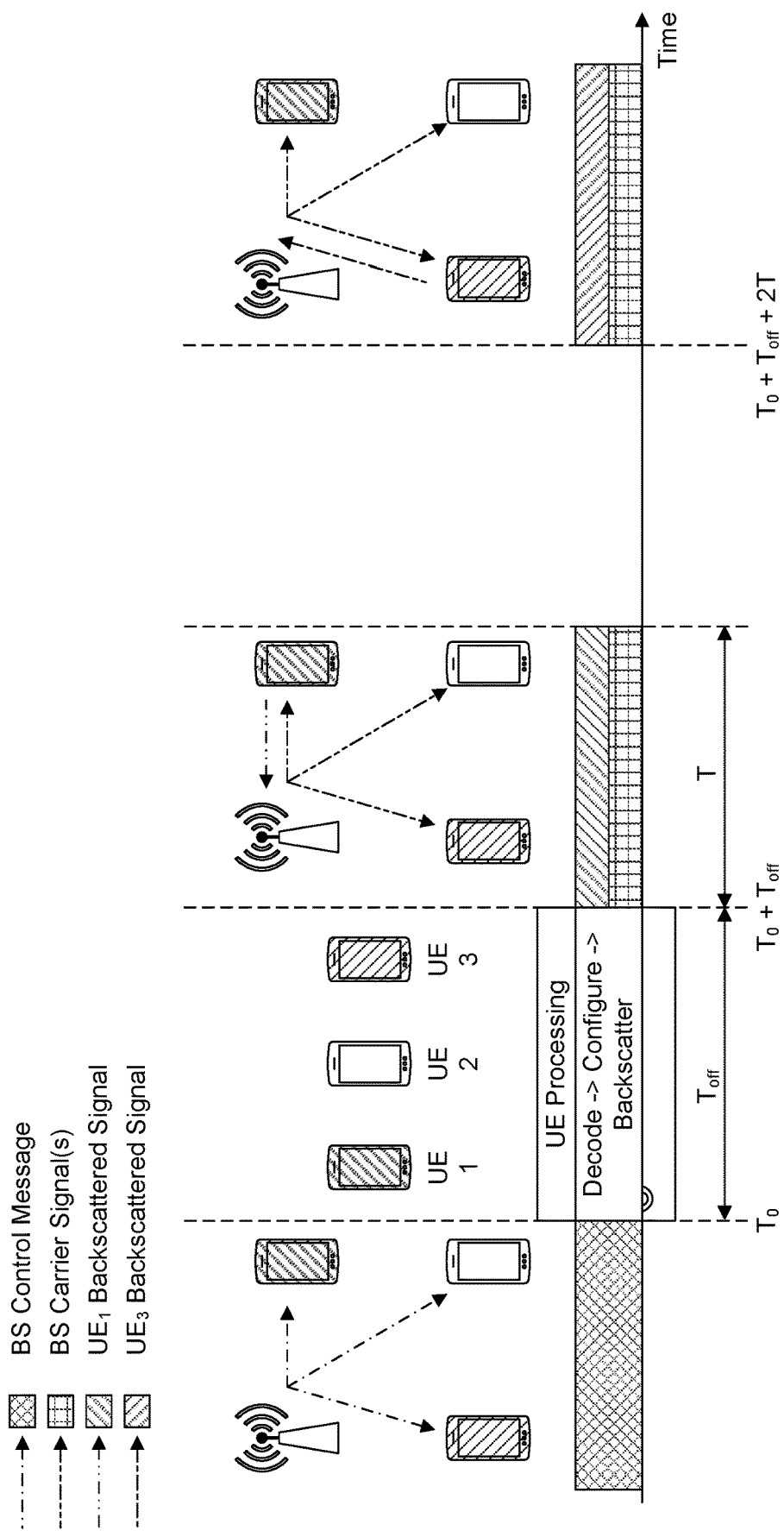
FIG. 9 illustrates a timing diagram and a flow diagram illustrating a zero-energy, multi-user feedback enabled by backscattering, according to one or more embodiments.

In the case when the WTRU receives a control message with a group ID, the WTRU may determine the time when it is supposed to modulate a backscattering signal based on a known preconfigured function of the currently configured WTRU's unique ID, frame number containing the beginning or end of control message, and/or any other parameter that can be explicitly included in the control message or implicitly conveyed from the received message configurations. One potential scenario that incorporates a multicast control message with feedback request is depicted in FIG. 9 assuming monostatic backscattering, but the timeline is equally applicable to bistatic backscattering. In an example, three different WTRUs, $UE_i$, $i \in \{1, 2, 3\}$, receive a multicast message destined for $UE_1$ and $UE_3$ only. $UE_1$ and $UE_3$ decode the control message and match their Group ID $N_g$ to that detected in the control message. On the other hand, $UE_2$ decodes the group ID indicated in the control message and declares a mismatch with its assigned value. Then, only $UE_1$ and $UE_3$ continue decoding the rest of the control message fields and identify a transmission time offset $T_{off}$ and a time division multiplexing (TDM) option. $UE_1$ then uses its unique Device ID, i.e. $N_{ID}=1$, and $N_g$ to determine the beginning of its transmission window, i.e. $T_0+T_{off}+T\times(N_{ID}-1)=T_0+T_{off}$. Similarly, $UE_3$ then uses its unique Device ID, i.e. $N_{ID}=3$, and $N_g$ to determine the beginning of its transmission window, i.e. $T_0+T_{off}+T\times(N_{ID}-1)=T_0+T_{off}+2T$. Finally, $UE_1$ and $UE_3$ collect feedback information and begin their backscattering transmissions at the assigned time windows. The WTRU control message processing state flow graph associated with that example is also depicted in FIG. 9.

The eNB/network should guarantee that the backscattering feedback operation will not interfere with the regular downlink transmissions scheduled for legacy information WTRU(s). This might be possible through frequency resource allocation optimization with sufficient guard bands between frequency resources allocated for backscattering operation and regular downlink transmissions, i.e. PDCCH and/or PDSCH. This might also be possible by scheduling backscattering operation at time units, e.g., OFDM symbols, mini-slots, slots, subframes, and/or frames, when a downlink transmission is not expected by legacy information WTRUs through, for example, efficient discontinuous reception (DRX/eDRX in IDLE mode or CONNECTED mode) design/configuration.

In various embodiments, for example, a complete procedure may begin in a first step by the eNB configuring essential parameters at the WTRU over the Uu air interface when the WTRU is in CONNECTED mode, i.e. EH control signaling transmission configurations over the ZE air interface, a unique ID, and/or a group ID, ... etc. The WTRU can then enter into an IDLE mode and adjust its low-energy receiver according to the ZE air interface saved configurations, i.e. reception frequency and bandwidth, reception schedule, and control message formats. The WTRU may then, in a third step, receive a control message with a specific format containing a group ID $N_g$, a request to report current battery level, and a time offset $T_{off}$ with respect to the end of the control message transmission. In a fourth step, the WTRU determines based on the group ID according to the function $f_t(N_g, N_{ID})$, where $N_{ID}$ is the WTRU's configured unique ID, that it should start modulating a carrier signal in $f_t(N_g, N_{ID})+T_{off}$ seconds after the end of the control message reception. The WTRU can report its current battery level and may include other information as well, such as a request of energy transfer and/or a maximum transfer duration. The eNB/network can grant in a fifth step the energy transfer request and provide the transfer configurations to the WTRU in another control message over the ZE air interface.

In another example, the WTRU may receive a control message with a specific format consisting of the WTRU's unique ID, a request to report its energy efficiency within the last T energy transfer period, and feedback transmission configuration, potentially among other fields in the message. The WTRU collects in a next step the required feedback information, i.e. the RF-to-energy conversion efficiency. Then, it determines when, and potentially at which frequency, to start modulating the received carrier for feedback transmission, for example at time $T_0+T_{off}$ where $T_0$ marks the end of the control message reception and at carrier frequency $f_1$. The WTRU then adjust its reception bandpass filter at carrier frequency $f_1$ and start carrier modulation/encoding at time $T_0+T_{off}$.

In another example, the eNB in a first step broadcasts an EH poll message with a specific format consisting of a broadcast identifier targeting recognized (i.e. ZE air interface configured WTRUs with unique and group IDs) and/or unrecognized WTRUs, contention-based transmission window duration and/or contention-free transmission window duration and their order, and other feedback transmission configuration, potentially among other fields in the message. WTRUs, that detect the EH poll message, determine their energy transfer requirements, i.e. based on their current battery level, in a second step. Then, they configure their backscattering devices to modulate/encode a carrier with an energy transfer request message on a specific frequency and at a specific time that are specified deterministically, in a contention-free window, or randomly according to some distribution, in a contention-based transmission window.

The eNB/network may consider an adaptive EH waveform and resource allocation/dedication scheme. For example, the eNB/network may decide, during an energy transfer grant period to a WTRU, that a change in the energy transfer configurations, i.e. EH transmission schedule and/or resource dedication scheme (RB-based, RE-based, Overlaid) along with waveform design options, might be necessary or more efficient from a network resource utilization point of view and/or from an energy harvesting efficiency perspective.

Control Signaling over Uu Air Interface

In various embodiments, for example, a WTRU can utilize the Uu air interface to send control messages pertaining to energy transfer request and/or configuration. The WTRU can exploit its current UL transmission activities and include EH related control signaling as part (e.g., an information element/field, of existing UCI formats, for example) of a scheduling request and/or CSI reporting. The WTRU can also consider a new UCI format that is dedicated for energy transfer request and/or energy harvesting related parameters/configuration.

Backscattering Link Control and Configurations

Figure 10:
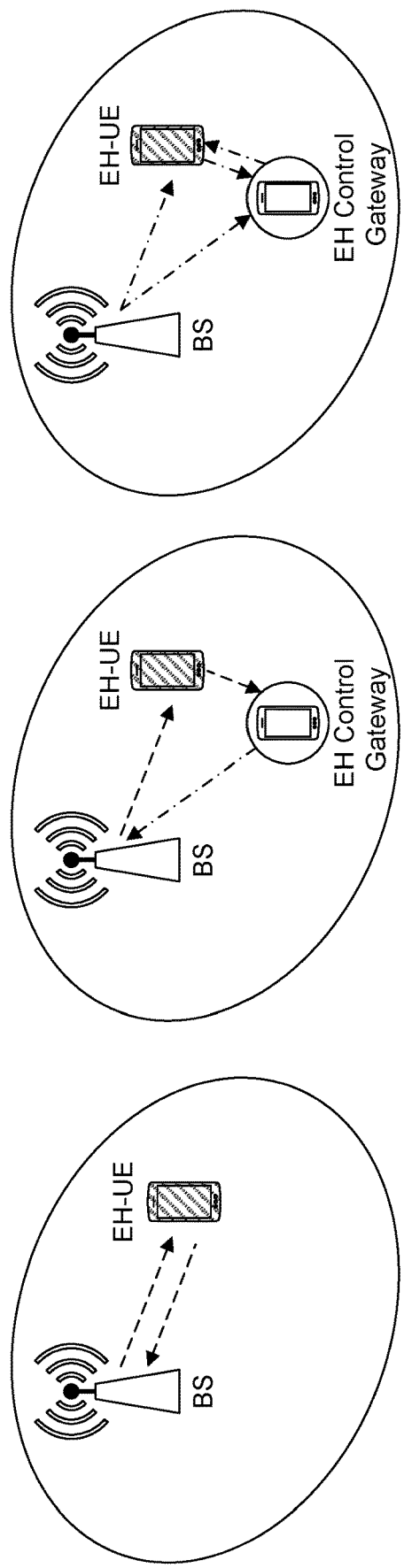
FIG. 10 illustrates three examples of feedback/backscattering links, according to one or more embodiments.

In this section, we address the adaptation of the backscattering transmission configuration based on the quality of the feedback link. The feedback link quality can be, in general, assumed to be dependent on both the distance to the carrier source (eNB/gNB) and feedback procedure, specifically, the distance to the backscattering receiver (eNB/gNB/EH gateway). For example, for an EH-WTRU located at the cell edge far from the serving BS as shown in FIG. 10, there are three different scenarios, each with an associated feedback link quality, namely:

The carrier is originated from the eNB/gNB and backscattered signal is also received by the BS.

The carrier is originated from the eNB/gNB and backscattered signal is received by the gateway.

The carrier is originated from the gateway and backscattered signal is also received by the gateway.

For the three described scenarios, assuming the EH gateway is closer to the EH-WTRU than the serving BS, the feedback link using the third scenario may be the best, the first scenario may be the worst, and the second scenario may be somewhere in between.

In order for the serving cell to efficiently allocate time/frequency/power resources for the feedback transmissions of EH WTRU(s), coordination between the BS and served EH WTRU(s) is necessary. Otherwise, the BS will have to allocate resources accommodating the worst-case scenario under its coverage, which might lead to unnecessary loss or time, frequency, and/or power resources.

In one method, the BS may send a known signal/sequence that can be used by the served EH WTRU(s) to measure the quality of the feedback link and generate a channel quality indicator (CQI). In a second step, the BS may transmit a control message requesting CQI feedback from interested EH WTRU(s). The control message may contain one or more of the following information elements:

A bit map indicating control message purpose, e.g., a CQI feedback request

A bit map indicating the resource elements configuration and number of resource elements $N_r$, i.e. $N_t$ time slots each with duration $T_0$ and $N_f$ subcarriers.

A number of EH WTRU groups G supported by the cell/BS and an index $i \in \{0, 1, 2, \ldots, G-1\}$ of the currently addressed group.

A bit map specifying the feedback transmission resource mapping functions from a set of preconfigured ones.

The EH WTRU, in a third step, use the unique ID $N_{ID}$, the number of resource elements, and the signaled number of WTRU groups to determine whether it should feedback its CQI value as a response to the current decoded control message, i.e., WTRU(s) configure its(their) feedback transmissions if $\lfloor N_{ID}/N_r \rfloor = i$. The EH WTRU(s) then, in a fourth step, determine the feedback transmission characteristics based on the mapping function(s) specified by the control message or preconfigured at the WTRU(s), i.e. determines the time slot index $i_t \in \{0, 1, 2, \ldots, N_t\}$ as $\lfloor N_{ID}/N_f \rfloor$ and the subcarrier index $i_f \in \{0, 1, 2, \ldots, N_f\}$ as $N_{ID}$ mod $N_f$. The BS/cell can then associate the received CQI value with a specific WTRU based on where it was received in the resource grid. The BS can also group the WTRUs based on their reported CQI values and can also form subgroups based on how many WTRUs can be served at the same time given the CQI value and the number of resources available. The EH WTRU(s) can configure their CQI subgroup number $i_s$ through the reception of a control message that contain one or more of the following information elements:

One or more thresholding values that can split/separate the time/frequency resource grid.

A bit map indicating the separation domain (e.g., time, frequency, or both).

In a two-dimensional plane (time-frequency), a bit map indicating the function of the separator, e.g., linear, circular, and/or parabolic.

The BS can finally schedule resources for EH WTRU(s) using their group number i, reported CQI value, their CQI subgroup number $i_s$, and/or any other relevant information (transmission duration, multiplexing option TDM/FDM/CDM/combination, etc). The EH WTRU(s) can then use those parameters to determine when/how they should configure their feedback transmissions using signaled and/or preconfigured mapping functions.

Figure 11:
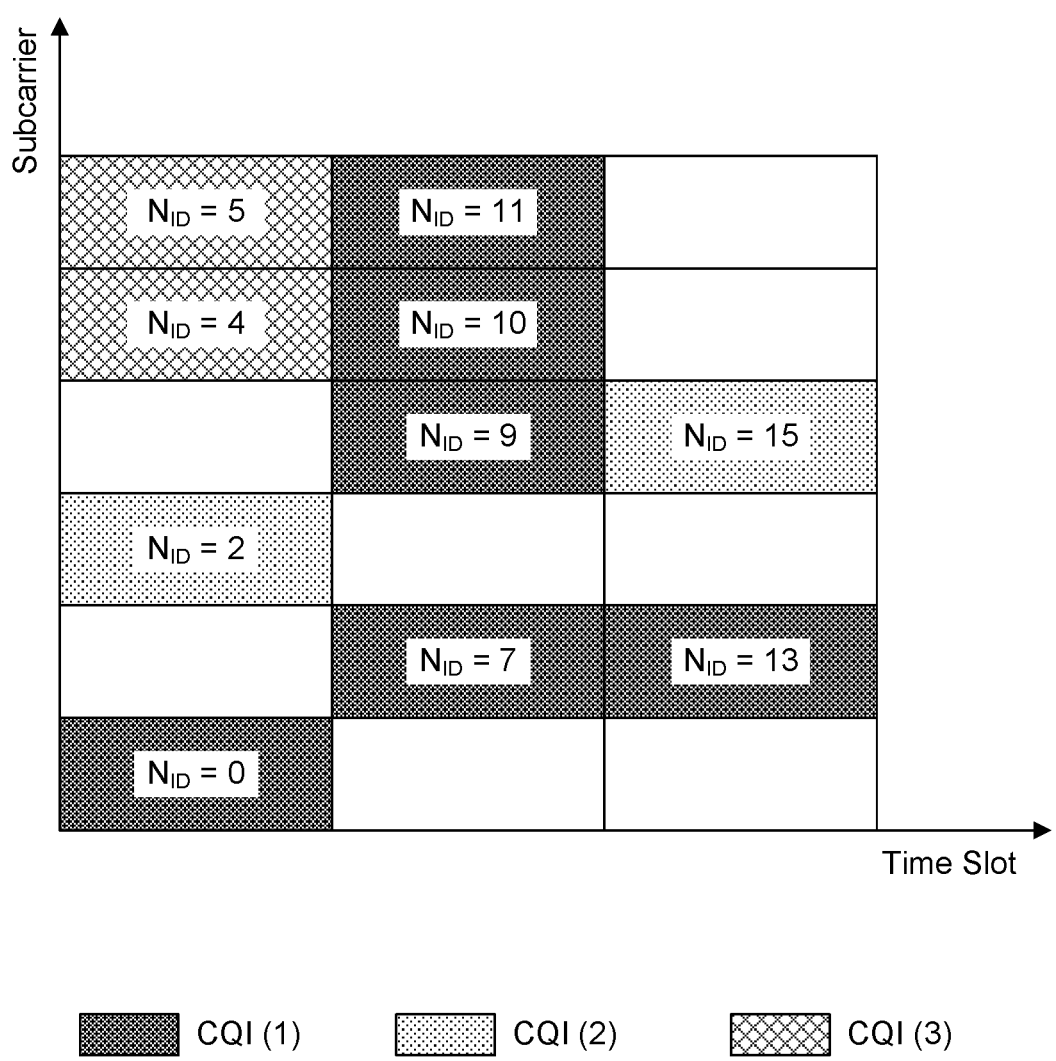
FIG. 11 illustrates an example of reception of different CQI values over a resource element grid, according to one or more embodiments.
Figure 12:
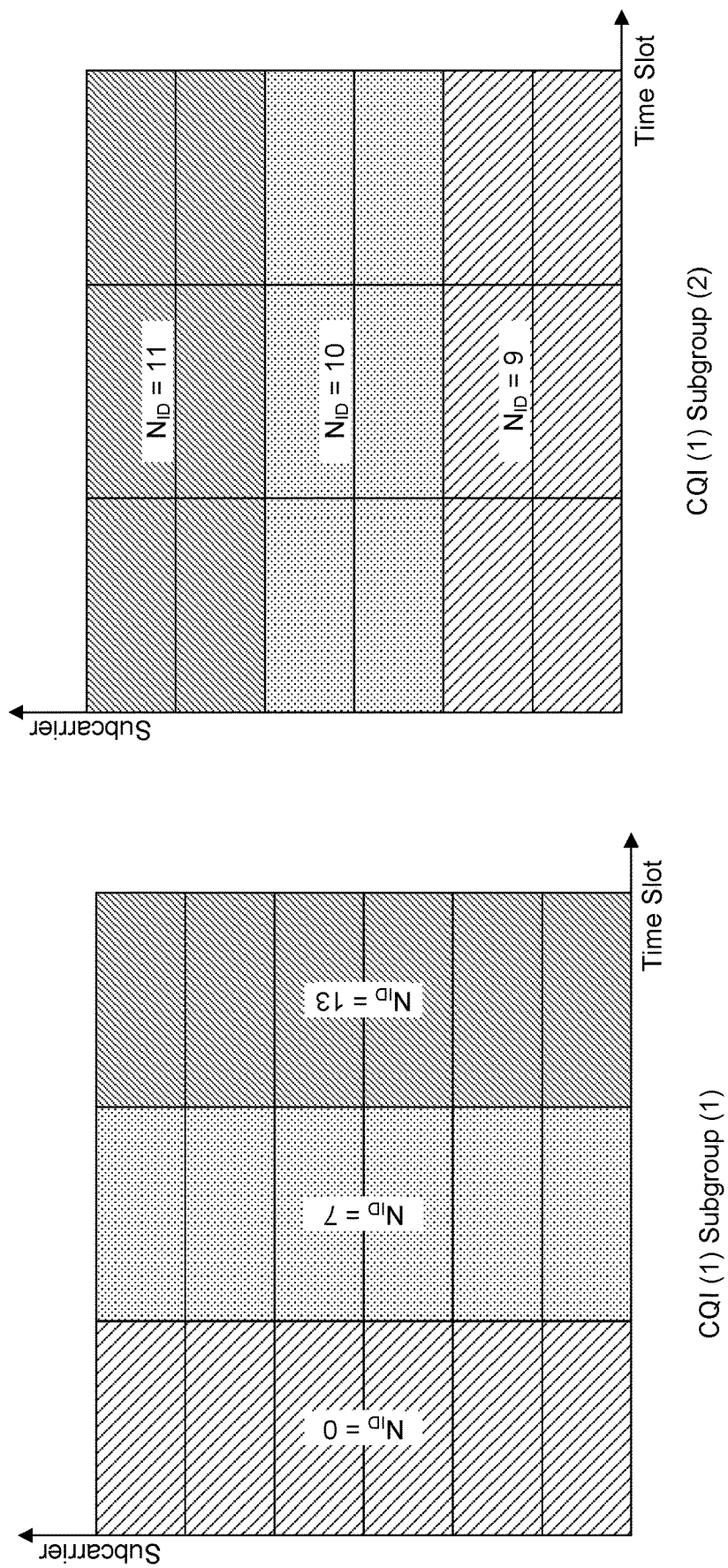
FIG. 12 illustrates an example of resource allocation for EH WTRUs with CQI measurements, according to one or more embodiments.

For example, a BS that is serving 10 EH WTRUs receives their estimated CQI values over the time/frequency resource grid as shown in FIG. 11. Given time slot and subcarrier number mapping functions $\lfloor N_{ID}/N_f \rfloor$ and $N_{ID}$ mod $N_f$, the BS may determine that EH WTRUs with $N_{ID} \in \{0, 7, 9, 10, 11, 13\}$ have reported a CQI value 1 (other mapping functions are also possible). The BS needs to allocate 6 resource elements for WTRUs reporting CQI(1). Therefore, it decides to separate the WTRUs into two subgroups using a linear separator such that WTRUs reporting at subcarrier indices strictly below 3 are assigned to subgroup 1, whereas all others are assigned to subgroup 2. The BS can then signal EH WTRUs in subgroup 1 to consider TDM and, given their CQI value, they know they should be assigned 6 resources, so they use all 6 subcarriers. The BS can also, in another time instant, signal EH WTRUs in subgroup 2 to consider FDM and, given their knowledge of the number of required resources (6 resource elements) and the subgroup index (i.e. associated separating line), they can easily map their transmissions to the resources as shown in FIG. 12.

Figure 13:
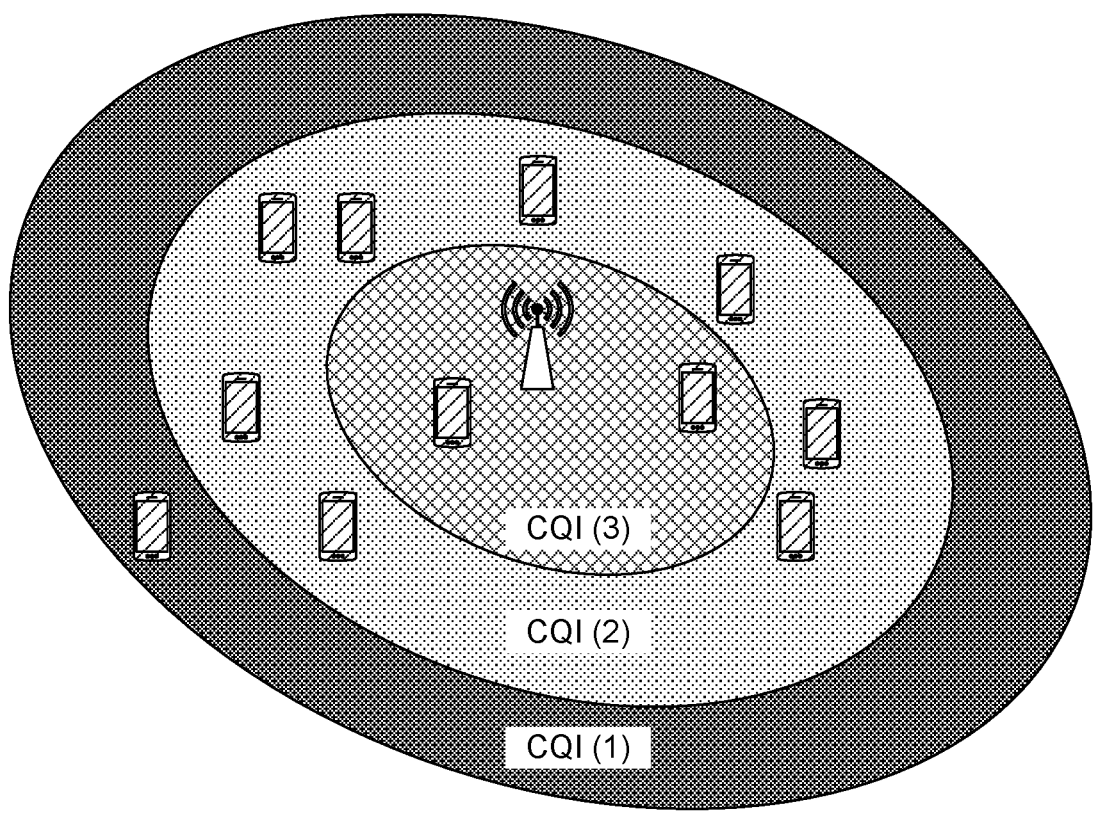
FIG. 13 illustrates an example of WTRUs distribution within CQI rings around a base station, according to one or more embodiments.

In a second method, control signaling overhead before resource scheduling may be reduced but resource utilization may be slightly less efficient depending on deployment scenario, number of served EH WTRUs, their distribution under the serving cell coverage, and their feedback channel quality. In this method, the BS may incrementally increase its transmission power and transmit a known signal/sequence that is directly backscattered by EH WTRU(s) as long as the measured received signal power is above a certain threshold that is preconfigured at the WTRU or signaled as part of the received signal/sequence. The BS can then approximately determine the number of EH WTRU(s) within a specific radius based on the strength of the received backscattered signal since the received signal strength is approximately linearly proportional to the number of backscattering WTRUs. The BS can then deduce the approximate number of EH WTRUs within a specific annulus that should be assigned the same CQI value as shown in FIG. 13. The BS can then determine the feedback transmission configuration based on the EH WTRUs distribution over annuli such that WTRUs allocated less resources than might be required by their CQI value split their message transmissions into multiple frames and use one bit in each frame to indicate the end of message transmission. The BS can use this end of message bit for subsequent scheduling of EH WTRUs. For this method, some WTRUs might be time/frequency resources overprovisioned, which would lead to the slight resource utilization inefficiency, but the BS can limit the inefficiency as a tradeoff with the number of transmissions required to support a message of certain length for WTRUs with low CQI values. The BS can determine the CQI value used by each WTRU using knowledge of the feedback message size and number of received frames. For example, for the specific exemplary scenario depicted in FIG. 13, the BS may decide to allocate resources for EH WTRUs based on CQI(2) since the majority of WTRUs under its coverage have this CQI value which leads to having two WTRUs being overprovisioned and only a single WTRU requiring multiple transmissions that can be triggered by the BS in a later time using unicast transmissions.

From an EH WTRU perspective, it receives in a first step a known signal/sequence from the serving BS, uses a portion of it to measure the signal strength, and, if it is above a certain threshold, it backscatters the remaining portion of the signal/sequence to the BS. The EH WTRU uses the number of times the received known signal/sequence was above a specific threshold within a specific period of time to determine its CQI value. Alternatively, it might determine the CQI value based on the reception of another known signal/sequence transmitted from the serving BS. The EH WTRU can then use the determined CQI value and signaled parameters in a received control message in addition to any preconfigured parameters to configure its feedback transmission characteristics, e.g., use a mapping function to determine the time slot and subcarrier index to be used for feedback transmission based on its unique ID, group ID, TDM/FDM/CDM configuration, or any other parameter. The EH WTRU can include at least one bit in its feedback transmission to indicate the end of a message.

The feedback message in both methods may be transmitted as part of a frame that contains other information such as frame format, payload size, end of message indication, request for additional resources indication, ... etc. The total transmission time must comply with the time slot duration specified by the BS's control message. For example, an EH WTRU receiving a control message polling/enquiring for WTRUs interested in energy harvesting, may decide to include additional information in the feedback frame such as current battery level or expected duration before the battery level reaches a certain threshold. If the configured time slot duration is not sufficient for the feedback of this information, the EH WTRU may then choose a frame format that indicates the current frame as part of a larger message, using an end of message indication bit, and containing a few bits (depending on system implementation, these might be 2, 3, or more bits) that can be used to request additional resources for the next feedback frame transmission.

The two methods described above were discussed in the context of the first scenario identified at the beginning of the section, but they are also applicable (probably with a slight modification) to the other two scenarios.

In various embodiments, an energy harvesting capable WTRU may perform one or more functions such as: 1) configuring signal/waveform format, reception schedule, unique/group IDs based on higher-layer info; 2) receiving a known sequence (one or more times within a known period) and generating a CQI value based on the detected channel quality; 3) receiving thresholding parameters and using known mapping functions to determine a group ID and/or a CQI subgroup ID; 4) Receiving energy harvesting poll with transmission time offset and transmission duration for backscattering; 5) determining carrier frequency (block of carriers), transmission start-time based on mapping function in the provided contention-free transmission window; and 6) Modulating and encoding a carrier(s) with feedback information (including any additional assisting information, i.e. resources request) via backscattering technique.

ZE Access/Mobility Control

Access Control in "RRC Connected" State

In "RRC Connected" state, WTRU(s) is(are) uniquely identified within a cell using C-RNTI and therefore can be uniquely addressed for EH purposes and provide feedback in a contention-free transmission. For the sake of providing efficient EH signaling over the ZE air interface, the eNB/gNB may decide to provide the WTRU(s) with alternative unique and/or group identifier(s) that might be shorter in length than C-RNTI. Access control in this state over the ZE air interface follows a contention-free transmission scheme described herein (e.g., in the section of WTRU/Device control and feedback signaling).

Access Control in "RRC Inactive/Idle" State

In "RRC Inactive" state, one or more WTRUs are uniquely identified within an RNA using I-RNTI that is defined at NG-RAN, WTRU(s) can also be identified by a ZE unique and/or group ID(s) within the latest cell where it(they) was(were) in "RRC Connected" state. In "RRC Idle" state, WTRU(s) is(are) uniquely identified within a TA using s-TMSI that is defined at the network, as for "RRC Inactive" WTRU(s) can also be identified by a ZE unique and/or group ID(s) within the latest cell where it(they) was(were) in "RRC Connected" state. WTRU(s) should keep track of the changes in the (re-)selected cell according to the cell (re-)selection procedure in "RRC Inactive/Idle" states and make sure that the ZE unique/group IDs are relinquished once the cell where the WTRU(s) was(were) last identified in "RRC Connected" state changes.

Given a WTRU in "RRC Inactive" or "RRC Idle" state, gNB(s) utilize(s) EH related DL signaling over the ZE air interface to request information feedback from the WTRU based on contention-free or contention-based transmission schemes depending on the considered scenario, i.e. WTRU mobility, number of inactive WTRUs/devices, RRC state and transitions, security conditions/constraints, available EH control resources and their utilization.

Figure 14:
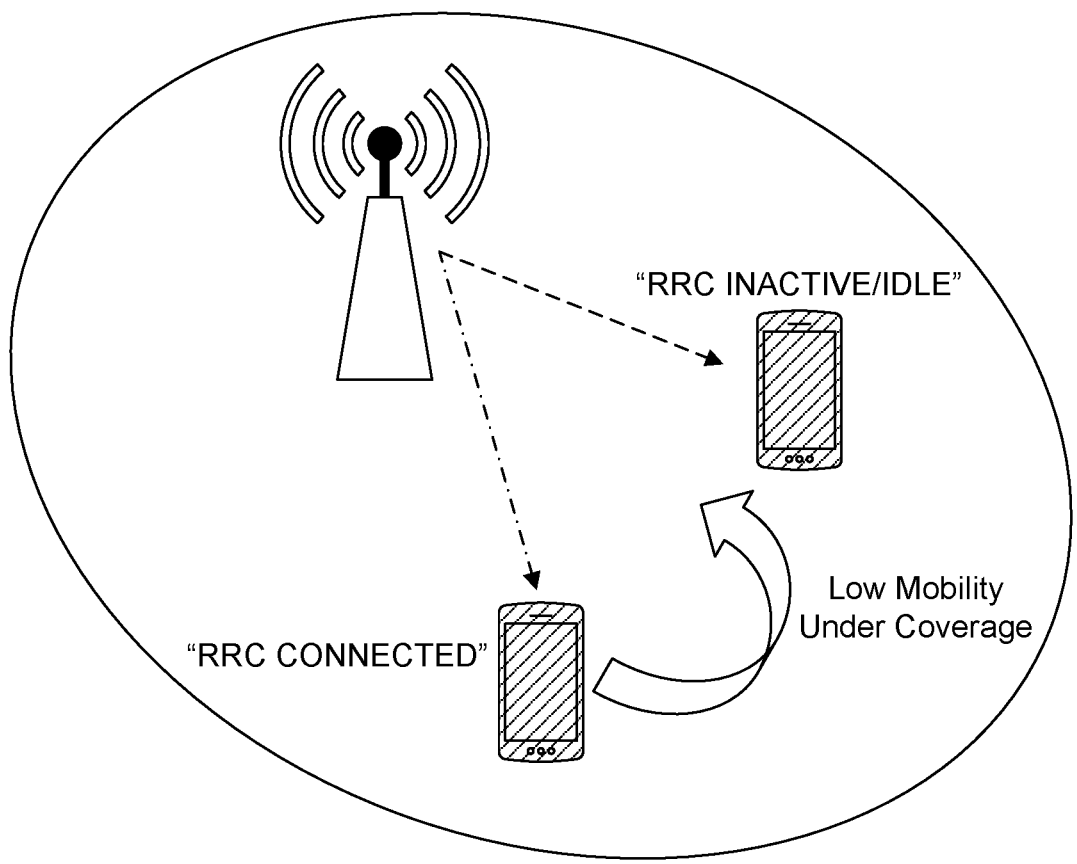
FIG. 14 illustrates a WTRU transition from an RRC Connected state to an RRC Inactive or RRC Idle state within a same cell coverage, according to one or more embodiments.
Figure 15:
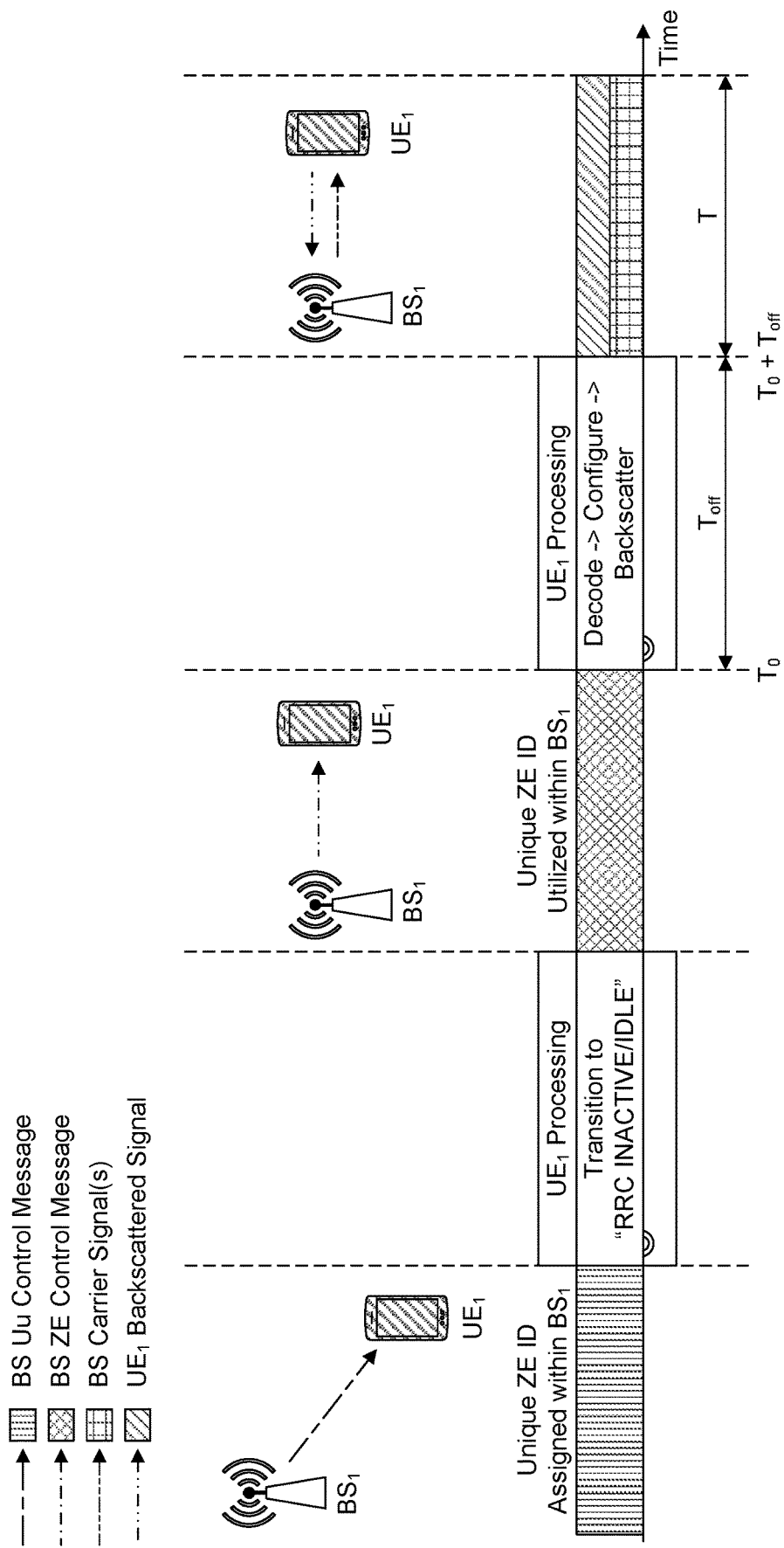
FIG. 15 is an example of timeline for EH control and signaling associated with contention-free feedback transmissions, according to one or more embodiments.

In one scenario shown in FIG. 14, a WTRU transitions to an "RRC Connected" state under the coverage of $BS_1$ and is configured with a ZE unique/group ID over the Uu air interface, or alternatively C-RNTI is used over the ZE air interface to assign a ZE unique/group ID, or in another alternative the WTRU configures a ZE unique/group ID based on its assigned C-RNTI and mapping that is preconfigured at the WTRU or provided using system information. The WTRU then might transition to an "RRC Inactive/Idle" state while it stays under the coverage of $BS_1$ due to low mobility or being stationary (no mobility). Therefore, for this scenario, $BS_1$ can still signal and control the WTRU for EH purposes over the ZE air interface using its ZE unique/group ID. One potential timeline for EH control and signaling that is associated with such a scenario is shown in FIG. 15.

Figure 16:
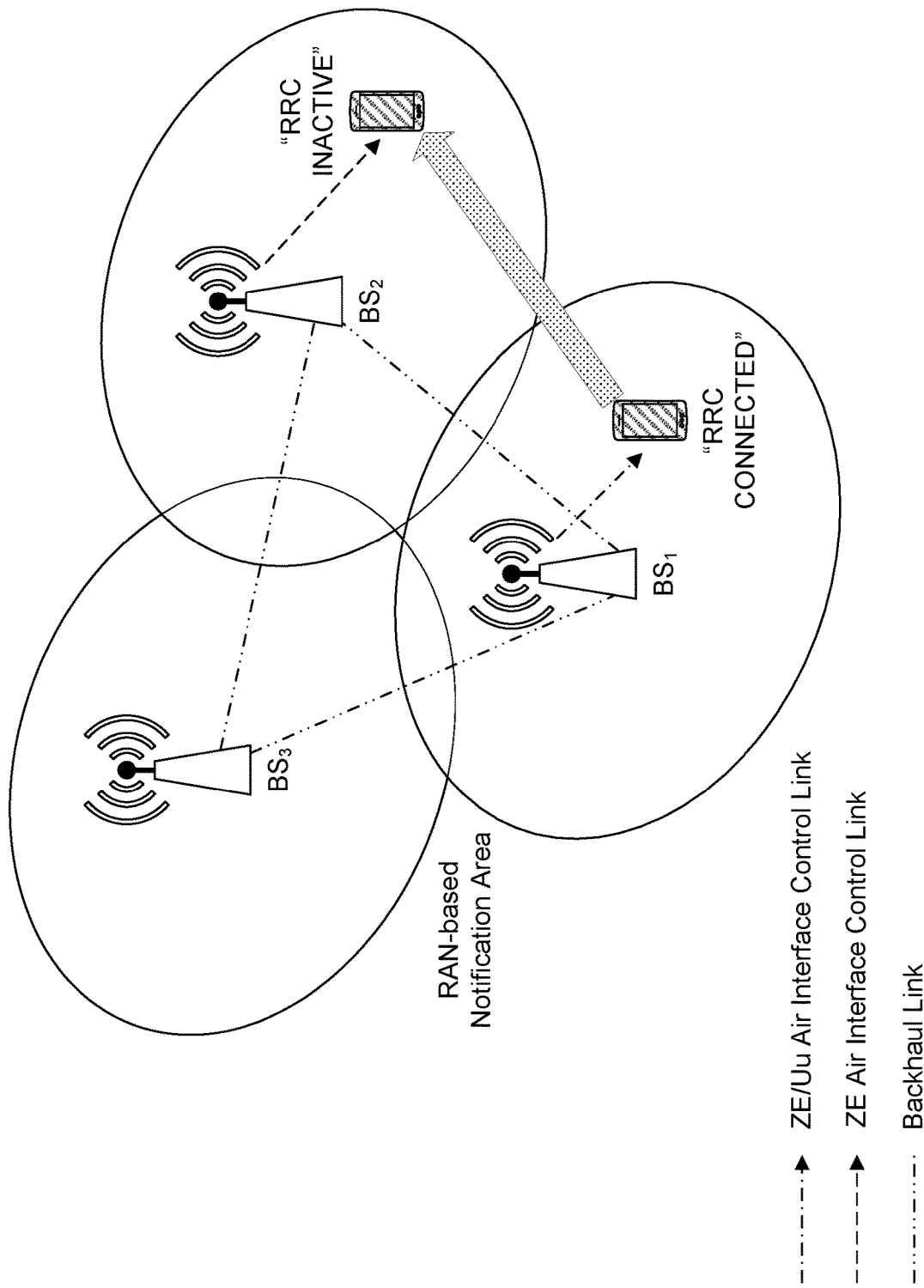
FIG. 16 illustrates a WTRU transition from an RRC Connected state to an RRC Inactive state within a same RAN-based notification area, according to one or more embodiments.

In another scenario shown in FIG. 16, a WTRU transitions to an "RRC Connected" state under the coverage of $BS_1$ and is configured with a ZE unique/group ID. The WTRU then might transition to an "RRC Inactive" state while moving from $BS_1$ to $BS_2$ coverage but is still under the coverage of the same RAN-based area notification (RNA). The WTRU is assigned an I-RNTI as an identifier, during its transition, which is kept at the NG-RAN to uniquely identify the WTRU within the RNA. The WTRU detects a change in the selected cell as part of cell (re-)selection procedure and relinquishes its ZE unique/group ID, and similarly $BS_1$ can detect the absence of a WTRU with a specific ZE unique/group ID as part of EH related control signaling and can reassign the ZE unique ID to another WTRU under its coverage. For such a WTRU to regain/resume access to network resources for EH purposes or to reconfigure its hardware for optimal energy EH experience, mechanisms that can enable unique and/or group control signaling over ZE air interface should be defined.

In an example, $BS_1$ detects the absence of the WTRU in a first step, then it might in a second step coordinate with the rest of BSs within the same RNA to broadcast a control message using, as an identifier, one of the following options: 1) the WTRU's I-RNTI as a unique identifier within RNA; 2) a unique identifier that is compact in form which is obtained as a function of the WTRU's I-RNTI, where the function can be preconfigured at the WTRU or signaled during an "RRC Connected" state; and 3) a group identifier that is obtained as a function of more than one I-RNTI such that this identifier can be mapped back to the WTRU's I-RNTI using a mapping function that is preconfigured at the WTRU or signaled during an "RRC Connected" state or that is selected from a set of preconfigured functions via an additional information element in the control message.

As an alternative, BSs within an RNA might coordinate with the network to obtain the identifier(s) as a function of the WTRU(s) I-RNTI(s) and/or its(their) IMSI(s)/TMSI(s). In a third step, a WTRU that detects a change in the selected cell decodes the identifier in the control message, ensures that it matches one of its assigned IDs, and determines its feedback transmission parameters based on that identifier, other assisting information elements in the control message, and some mapping function in a contention-free transmission window. The additional information in the control message might be required to ensure that the selected resources for all addressed WTRUs through their I-RNTIs by the mapping function will be unique.

Figure 17:
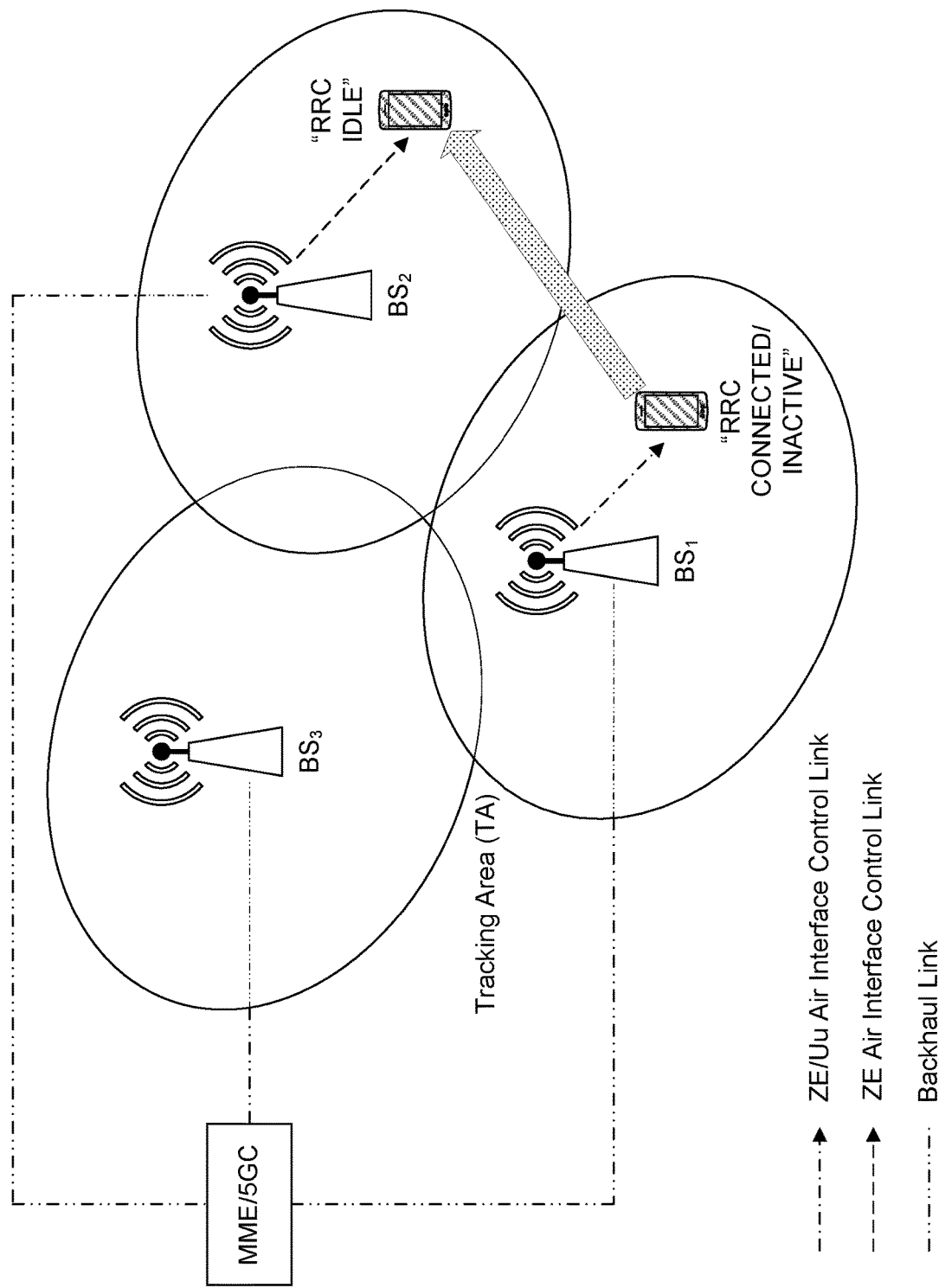
FIG. 17 illustrates a WTRU transition from an RRC Connected or RRC Inactive state to an RRC Idle state under a tracking area coverage, according to one or more embodiments.

In another example that is applicable to the scenario shown in FIG. 16 as well as that shown in FIG. 17 for a WTRU transition in to an "RRC Idle" state within a tracking area (TA), when the number of detected absent WTRUs within an RNA/TA is large, the amount of unique resources, i.e. without considering resources reuse among cells of the same RNA/TA, required for contention-free transmission within the RNA/TA might not be enough given a specific delay requirement and a contention-based transmission scheme should be utilized. In such a case and in a first step, gNBs within the RNA/TA broadcast a message declaring/configuring a contention-based transmission window for WTRU(s) interested in EH and that detected a change in the (re-)selected cell after its(their) transition to "RRC Inactive/Idle" state. In a second step, WTRU(s) configure(s) its(their) feedback transmission characteristics based on the broadcast message parameters, the configured/assigned I-RNTI(s)/TMSI(s)/IMSI(s) or a function thereof, and their current battery state or interest in EH signaling capability.

The WTRU(s) may then in a third step choose as feedback information, based on WTRU(s)' pre-configured parameters and/or broadcast message parameters, one or more of the following options: 1) the WTRU(s)' I-RNTI(s) assigned during its(their) transition to "RRC Inactive" state or the WTRU(s)' TMSI(s) in case of WTRU(s) in "RRC Idle" state; 2) a unique identifier that is compact in form which is obtained as a function of the WTRU(s) I-RNTI(s)/TMSI(s), where the function can be preconfigured at the WTRU or signaled during an "RRC Connected" state; 3) an identifier that is obtained as a function of the WTRU(s) I-RNTI(s) and/or its(their) IMSI(s)/TMSI(s); 4) a preamble that is chosen based on broadcast message parameters and/or as a function of the WTRU(s)' I-RNTI(s)/TMSI(s)/IMSI(s); and 5) a generic identifier of the WTRU(s)' EH capability.

Figure 18:
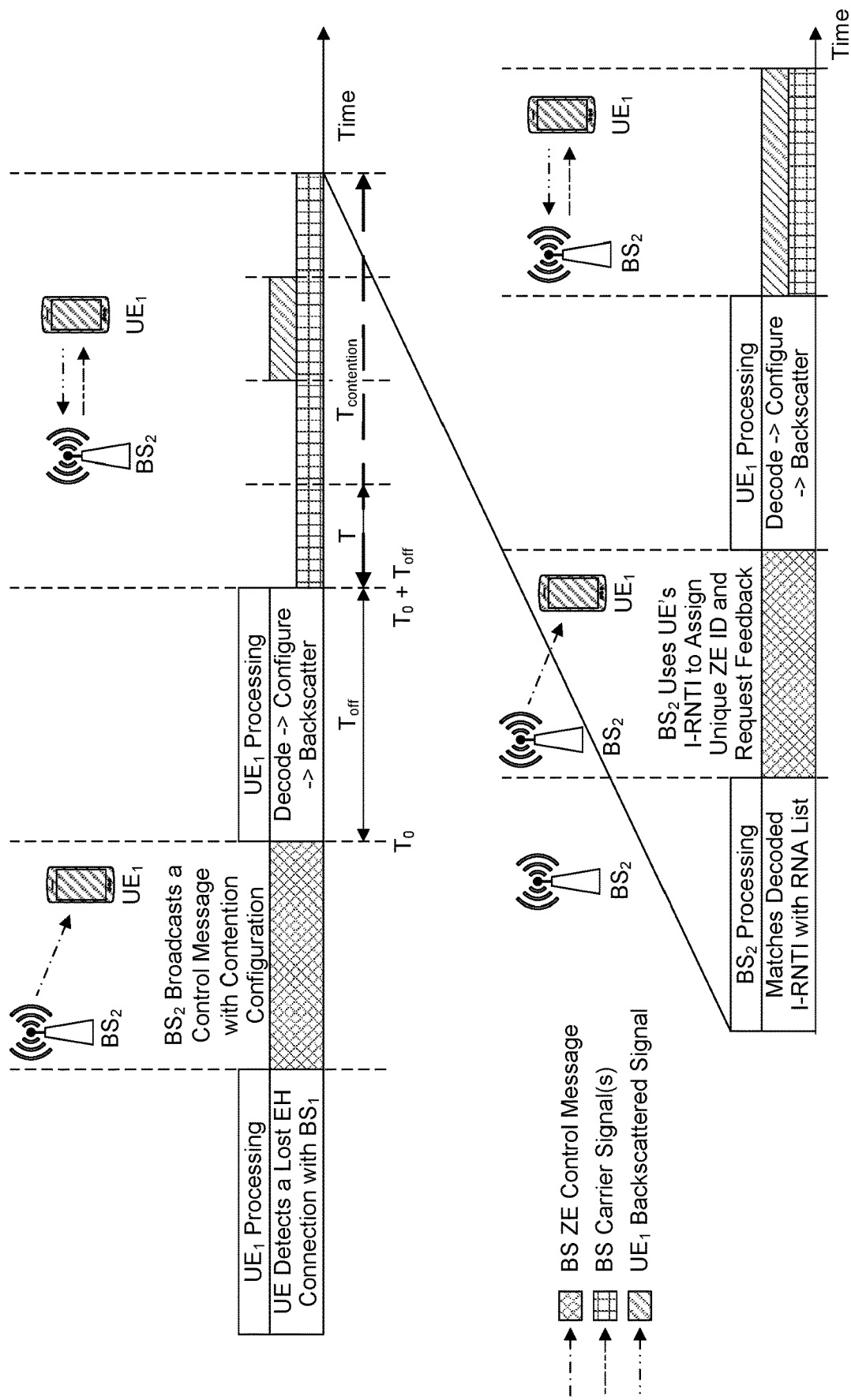
FIG. 18 is an example of timeline for EH control and signaling associated with contention-based feedback transmissions, according to one or more embodiments.

The feedback information might or might not be appended by CRC bits to help the gNB(s) detect decoding errors and identify collisions. In a fourth step, the WTRU(s) determine the carrier frequency and time slot within the contention-based transmission window to be used for backscattering the feedback information randomly according to some distribution that is preconfigured at the WTRU(s) or configured using assisting information that is provided as part of the broadcast control message. As an alternative solution to minimize collisions when EH control and signaling are based only on WTRU(s) capability, WTRU(s) interested in EH related signaling will decode the feedback messages over all carriers and at all the time slots within the contention-based transmission window before its(their) randomly selected time slot, and if it(they) detect the same WTRU capability identifier they will refrain from feedback transmission. One example timeline for contention-based feedback transmission is shown in FIG. 18.

In various embodiments, a WTRU may be equipped with a single narrowband EH device tunable to harvest energy at a center frequency, or multiple (e.g., on/off switchable) narrowband EH devices each tuned to a respective fixed center frequency. A WTRU may harvest energy from the same channel where it receives information or over another dedicated channel. The energy bearing signal may be a dedicated energy harvesting signal, an information bearing signal, or a combination of energy and information bearing signal. A WTRU may receive and/or transmit EH related control signaling over a Uu air interface or a ZE air interface. A WTRU (e.g., a WTRU incapable of Uu air interface control signaling) may initiate an energy transfer request as a response to a broadcast EH poll from an eNB using backscattering techniques. WTRUs may respond to a feedback request multicast messages using backscattering techniques considering either time division, frequency division, code division multiplexing or combination of these options.

In various embodiments, an EH WTRU may receive a known sequence over ZE air interface to determine its channel quality and feedbacks a CQI value over a resource element within the resource grid defined using a known mapping at the UE and serving BS. An EH WTRU may determines a group ID and CQI subgroup ID based on thresholding values received from the serving BS and configured/known mapping functions. An EH WTRU may use a configured group ID, CQI subgroup ID, and unique ID to determine/setup its feedback transmission characteristics. An EH WTRU may use the number of times a received known signal/sequence was above a specific threshold within a specific period of time to determine its CQI value. An EH WTRU may transmit its feedback message as part of a frame that may contain additional information, e.g., a frame format, a payload size, the end of message indication, a request for additional resources indication.

Figure 19:
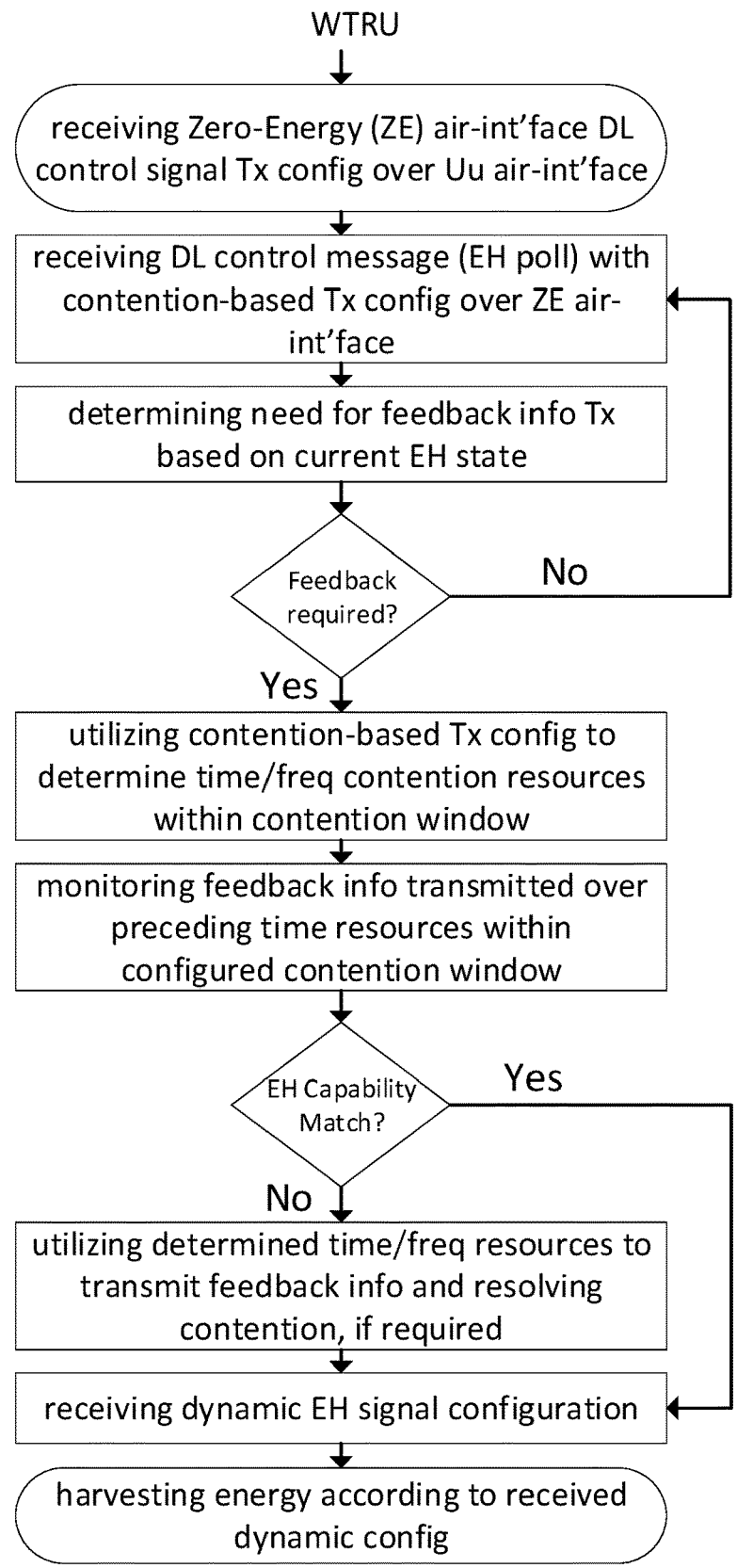
FIG. 19 is a flowchart illustrating an example procedure of enabling energy harvesting (EH) request utilizing a contention-based feedback, according to one or more embodiments.
Figure 20:
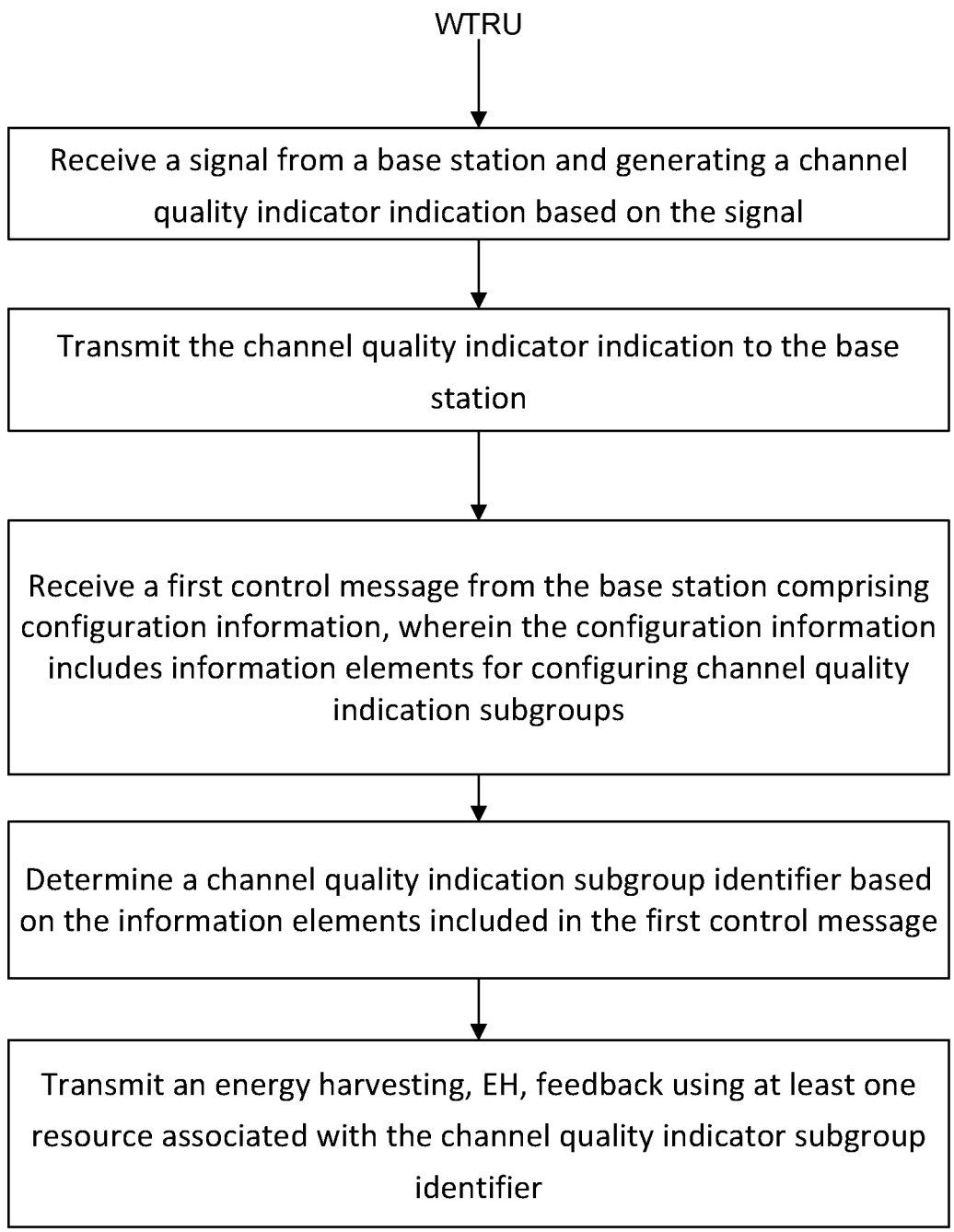
FIG. 20 is a flow diagram according to features of the disclosure.

Referring to FIG. 19, a flowchart illustrates an example procedure of enabling EH signaling using a contention-based feedback. This procedure may be implemented by an EH WTRU. In an example, a WTRU (e.g., an EH WTRU) may determine feedback transmission characteristics based on the WTRU's current battery state, which in a way accounts for additional delay or wait on when to transmit feedback. Once the decision by the WTRU to transmit feedback is made, the WTRU may contend for the uplink channel to determine a specific feedback transmission slot, and refrain from using the transmission slot if a similar or same EH capability indication is detected in prior transmission slots within the same contention window, or alternatively, delay, wait, or search for a subsequent contention-based transmission window.

For example, as shown in the flowchart, an EH WTRU may receive a control message including a zero-energy (ZE) EH transmission configuration. In an example, the ZE EH transmission configuration may comprise at least an indication including/indicating any of: a waveform, a frame format, a modulation type/rate, and a reception schedule. The EH WTRU may receive a DL control message (e.g., an EH poll) having a contention-based transmission configuration (e.g., received over a ZE air interface). The EH WTRU may determine whether there is a need for transmitting feedback information based on the EH WTRU's current EH state (e.g., current battery state or power level).

If there is a need for transmitting feedback information, the EH WTRU may determine one or more parameters for transmitting a feedback within a contention-based transmission window based on the contention-based backscattering configuration. For example, the EH WTRU may use the contention-based transmission configuration to determine time/frequency contention resources within the contention-based transmission window. In an example, the EH WTRU may determine, based on a current EH state, whether to transmit the feedback within the contention-based transmission window, and on a determination that the feedback is to be transmitted within the contention-based transmission window, determining the one or more parameters for transmitting the feedback based on the contention-based backscattering configuration and the current EH state of the WTRU. The one or more parameters discussed above may indicate one or more time slots and subcarriers considered for a contention-based backscattering transmission. The contention-based backscattering configuration may comprise any of: a transmission time offset, a transmission window, the contention-based transmission window, a number of time slots and subcarriers, and a contention strategy.

Still referring to FIG. 19, the EH WTRU may monitor feedback information transmitted over preceding time resources within the configured contention-based transmission window. For example, the EH WTRU may monitor and/or detect feedback transmissions sent by one or more other WTRUs within the contention-based transmission window, and each feedback transmission may include an indication of an EH capability of a particular WTRU other than the EH WTRU. In some examples, the other WTRUs may be EH WTRUs. The EH capability indication may indicate any of: an EH WTRU's waveform, supported EH signal format(s), and current energy harvesting need(s).

The EH WTRU may determine whether an EH capability detected from the feedback transmissions matches the EH capability of the EH WTRU. For example, the EH WTRU may detect a matched EH capability indication or identifier, and determine the matched EH capability indication/identifier is the same capability identifier of the EH WTRU (or corresponding to the EH WTRU). If a matched EH capability (e.g., determined from a matched EH capability indication or identifier) is detected from the feedback transmissions, the EH WTRU may delay transmitting the feedback information. For example, the EH WTRU may refrain from transmitting the feedback within the contention-based transmission window. If no matched EH capability is detected from the feedback transmissions within the contention-based transmission window, the EH WTRU may transmit the feedback using the determined parameters. For example, the EH WTRU may utilize determined time/frequency resources to transmit feedback information and, for instance, resolving contention, if required.

The EH WTRU may receive another control message including an EH signal configuration (e.g., a dynamic EH signal configuration) based on a determination that a matched EH capability being detected from the feedback transmissions within the contention-based transmission window. The EH WTRU may perform energy harvesting (e.g., transmit an EH signal) according to the received EH signal configuration.

Each of the following references are incorporated by reference herein: [1] PCT Application No. PCT/US18/63320 entitled "Network-initiated on-demand zero-energy paging method and apparatus"; [2] U.S. Provisional Patent Application No. 62/780,394 entitled "Signal design methods for concurrent delivery of energy and information"; [3] U.S. Provisional Patent Application No. 62/780,639 entitled "Methods for cell (re-)selection with ZE radio receivers"; [4] N. Van Huynh, et al., "Ambient Backscatter Communications: A Contemporary Survey," in IEEE Communications Surveys & Tutorials, vol. 20, no. 4, pp. 2889-2922, 2018; and [5] U.S. Provisional Patent Application No. 62/849,400.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of (or interchangeable with) any UE or mobile device recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a wireless transmit/receive unit (WTRU) for wireless communications, the method comprising:
    receiving a signal from a base station (BS) and generating a channel quality indication (CQI) based on the signal;
    transmitting the CQI to the BS;
    receiving a first control message from the BS comprising configuration information, wherein the configuration information includes information elements for configuring CQI subgroups;
    determining a CQI subgroup identifier (ID) based on the information elements included in the first control message; and
    transmitting an energy harvesting (EH) feedback using at least one resource associated with the CQI subgroup ID.

2. The method of claim 1, wherein transmitting the EH feedback is in response to receiving from the BS a second control message indicating a schedule for the EH feedback.

3. The method of claim 1, wherein transmitting the EH feedback comprises modulating a backscattered signal.

4. The method of claim 1, wherein receiving the signal from the BS triggers generation of the CQI.

5. The method of claim 1, wherein transmitting the CQI to the BS comprises transmitting the CQI using feedback resources that are based on an assigned WTRU ID.

6. The method of claim 1, wherein receiving the first control message comprises receiving a broadcast control message.

7. The method of claim 1, wherein receiving the first control message from the BS comprises receiving information elements having an indication of one or more of a separator domain, a thresholding parameter, or a separator function.

8. The method of claim 7, wherein the information elements comprise one or more of:
- an indication of one or more thresholding values that separate a time/frequency resource grid;
- a bit map indication of the separation domain; or
- a bit map indication of a function of a separator.

9. The method of claim 8, wherein the function of the separator is linear, the separation domain is frequency, and the thresholding value is a frequency resource index.

10. The method of claim 8, wherein the bit map indication of the separation domain comprises any of time and frequency, and wherein the bit map indication of the function of the separator comprises any of a linear function, a circular function, and a parabolic function.

11. A wireless transmit/receive unit (WTRU) comprising circuitry, including a transmitter, a receiver, a processor, and memory, the WTRU configured to:
- receive a signal from a base station (BS) and generate a channel quality indication (CQI) based on the signal;
- transmit the CQI to the BS;
- receive a first control message from the BS comprising configuration information, wherein the configuration information includes information elements for configuring CQI subgroups;
- determine a CQI subgroup identifier (ID) based on the information elements included in the first control message; and
- transmit an energy harvesting (EH) feedback using at least one resource associated with the CQI subgroup ID.

12. The WTRU of claim 11, wherein the EH feedback is in response to receiving from the BS a second control message indicating a schedule for the EH feedback.

13. The WTRU of claim 11, wherein the EH feedback comprises a transmitted backscattered signal from the WTRU.

14. The WTRU of claim 11, wherein the first control message from the BS comprises at least one information element having an indication of one or more of a separator domain, a thresholding parameter, or a separator function.

15. The WTRU of claim 14, wherein the information elements received from the BS comprise one or more of:
- an indication of one or more thresholding values that separate a time/frequency resource grid;
- a bit map indication of the separation domain; or
- a bit map indication of a function of a separator.

16. A non-transitory computer readable medium having instructions which when executed by a computer perform a method of:
- receiving a signal from a base station (BS) and generating a channel quality indication (CQI) based on the signal;
- transmitting the CQI to the BS;
- receiving a first control message from the BS comprising configuration information, wherein the configuration information includes information elements for configuring CQI subgroups;
- determining a CQI subgroup identifier (ID) based on the information elements included in the received first control message; and
- transmitting an energy harvesting (EH) feedback using at least one resource associated with the CQI subgroup ID.

17. The non-transitory computer readable medium of claim 16, wherein receiving the first control message from the BS comprises receiving information elements having indication of one or more of a separator domain, a thresholding parameter, or a separator function.

18. The non-transitory computer readable medium of claim 17, wherein the information elements received from the BS comprise one or more of:
- an indication of one or more thresholding values that separate a time/frequency resource grid;
- a bit map indication of the separation domain; or
- a bit map indication of a function of a separator.

19. The non-transitory computer readable medium of claim 18, wherein the function of the separator is linear, the separation domain is frequency, and the thresholding value is a frequency resource index.

20. The non-transitory computer readable medium of claim 18, wherein the bit map indication of the separation domain comprises any of time and frequency, and wherein the bit map indication of the function of the separator comprises any of a linear function, a circular function, and a parabolic function.

* * * * *